United States Patent [19]

Brown

[11] Patent Number: 5,544,532
[45] Date of Patent: Aug. 13, 1996

[54] MAGNETIC FLOWMETER WITH IMPROVED ACCURACY

[75] Inventor: Christopher R. Brown, Wrentham, Mass.

[73] Assignee: The Foxboro Company, Foxboro, Mass.

[21] Appl. No.: 190,037

[22] PCT Filed: Jul. 31, 1992

[86] PCT No.: PCT/US92/06375

§ 371 Date: May 25, 1994

§ 102(e) Date: May 25, 1994

[87] PCT Pub. No.: WO93/03332

PCT Pub. Date: Feb. 18, 1993

Related U.S. Application Data

[63] Continuation-in-part of Ser. No. 738,595, Jul. 31, 1991, Pat. No. 5,289,725.

[51] Int. Cl.⁶ .................................................. G01F 1/58
[52] U.S. Cl. ..................................... 73/861.16; 73/861.12
[58] Field of Search ........................... 73/861.08, 861.11, 73/861.12, 861.13, 861.14, 861.15, 861.16, 861.17; 364/510

[56] References Cited

U.S. PATENT DOCUMENTS

| 2,929,247 | 3/1960 | Sturgeon | 73/862.12 |
|---|---|---|---|
| 3,194,068 | 7/1965 | Mannherz et al. | 73/861.12 |
| 3,286,522 | 11/1966 | Cushing | 73/861.12 |
| 3,610,040 | 10/1971 | Wada | 73/861.12 |
| 3,750,468 | 8/1973 | Grauer | 73/861.12 |
| 4,128,776 | 12/1978 | Boquist et al. | 310/11 |
| 4,181,013 | 1/1980 | Wada | 73/861.12 |
| 4,214,477 | 7/1980 | Schmoock | 73/861.12 |
| 4,253,340 | 3/1981 | Schmoock | 73/861.12 |

(List continued on next page.)

FOREIGN PATENT DOCUMENTS

| 0163396 | 12/1985 | European Pat. Off. . |
|---|---|---|
| 2368018 | 12/1978 | France . |
| 2950039 | 2/1981 | Germany . |
| 58196419 | 11/1983 | Japan . |
| 48-196419 | 11/1983 | Japan . |
| 59222719 | 12/1984 | Japan . |
| 62042013 | 2/1987 | Japan . |
| 2054122 | 2/1990 | Japan . |
| WO83/02000 | 5/1982 | WIPO . |
| WO87/01197 | 2/1987 | WIPO . |
| WO90/07694 | 7/1990 | WIPO . |
| WO91/05225 | 4/1991 | WIPO . |

OTHER PUBLICATIONS

Database WPI, Sectin E1, Week 7936, Oct. 17, 1979, Derwent Publications Ltd., London, GB; Class R13, AN 79–H6878B & SU,A,635 396 (Tall Measuring) 30 Nov. 1978.

Primary Examiner—Hezron E. Williams
Assistant Examiner—Richard A. Moller
Attorney, Agent, or Firm—Wolf, Greenfield & Sacks, P.C.

[57] ABSTRACT

A monolithic flowtube for use with an electromagnetic flowmeter includes an inner portion formed of an improved purity dielectric material having a reduced number of mobile ions, a pair of electrodes adjacent the exterior surface of the inner portion and capacitively coupled thereto, and an outer layer of ceramic material adjacent the exterior surface of the inner conduit and electrodes. A method of manufacturing the flowtube includes the steps of forming a dielectric material into a substantially tubular conduit, depositing a conductive material, preferably a refractory metal, onto the exterior of the tubular conduit, forming an outer layer of ceramic material over the tubular conduit, and firing all components simultaneously in a reducing atmosphere to form a monolithic flowtube body. A magnetic flowmeter includes, in addition to a flow tube and a pair of electrodes, a magnetic field source for creating a time-varying magnetic field passing through the flow tube, and special circuitry, including secondary coil windings, for electrically altering the average direction of the magnetic field relative to the flow tube access so as to minimize the zero offset present in the output flow signal from the electrodes.

23 Claims, 11 Drawing Sheets

U.S. PATENT DOCUMENTS

| | | | |
|---|---|---|---|
| 4,262,542 | 4/1981 | Freund, Jr. et al. | 73/861.12 |
| 4,269,071 | 5/1981 | Wada | 73/861.12 |
| 4,279,166 | 7/1981 | Gryn et al. | 73/861.12 |
| 4,281,552 | 8/1981 | Nissen et al. | 73/861.12 |
| 4,290,312 | 9/1981 | Kobayashi | 73/861.12 |
| 4,297,895 | 11/1981 | Gryn | 73/861.12 |
| 4,388,834 | 6/1983 | Schmoock | 73/861.12 |
| 4,409,846 | 10/1983 | Ueno | 73/861.17 |
| 4,428,241 | 1/1984 | Davis et al. | 73/861.12 |
| 4,454,766 | 6/1984 | Reinhold et al. | 73/861.12 |
| 4,459,857 | 7/1984 | Murray et al. | 73/861.12 |
| 4,483,201 | 11/1984 | Haug | 73/861.12 |
| 4,499,754 | 2/1985 | Akano et al. | 73/861.12 |
| 4,507,975 | 4/1985 | Bittner et al. | 73/861.12 |
| 4,513,624 | 4/1985 | McHale et al. | 73/861.12 |
| 4,517,846 | 5/1986 | Harrison et al. | 73/861.12 |
| 4,539,853 | 9/1985 | Appel et al. | 73/861.12 |
| 4,565,619 | 1/1986 | Gardner et al. | 204/400 |
| 4,567,775 | 2/1986 | Schmoock | 73/861.12 |
| 4,604,905 | 8/1986 | Rademacher-Dubbick | 73/861.12 |
| 4,631,969 | 12/1986 | Schmoock | 73/861.12 |
| 4,658,652 | 4/1987 | Picone et al. | 73/861.12 |
| 4,679,442 | 7/1987 | Kuboto | 73/861.12 |
| 4,716,649 | 1/1988 | Bittner et al. | 29/602.1 |
| 4,726,236 | 2/1988 | Wada | 73/861.16 |
| 4,741,215 | 5/1988 | Bohn et al. | 73/861.12 |
| 4,782,709 | 11/1988 | Goto et al. | 29/602.1 |
| 4,912,838 | 4/1990 | Goto et al. | 29/602.1 |
| 4,932,268 | 6/1990 | Hafner | 73/861.12 |
| 5,090,250 | 2/1992 | Wada | 73/861.12 |
| 5,275,059 | 1/1994 | Lew et al. | 73/861.15 |
| 5,301,556 | 4/1994 | Nissen et al. | 73/861.15 |

MAGNETIC FLOWMETER WITH IMPROVED ACCURACY

This application is a continuation-in-part of U.S. Ser. No. 07/738,595, filed Jul. 31, 1991, now U.S. Pat. No. 5,289, 725.

FIELD OF THE INVENTION

This invention relates generally to magnetic flowmeters for measuring the flow rate of a fluid, and, more particularly, to a flowmeter having a reduced zero offset in its output flow signal.

BACKGROUND OF THE INVENTION

Electromagnetic flowmeters for measuring the volumetric flow rates of fluids are used extensively in the process control industry. In a magnetic flowmeter, an electromagnetic field is generated having lines of flux which are ideally perpendicular to the longitudinal axis of the flowtube through which the fluid to be metered is conducted. The flux lines are also ideally perpendicular to the transverse axis along which a pair of measuring electrodes are located at diametrically-opposed positions with respect to the flowtube. An electromotive force induced in the fluid by the magnetic field and the moving fluid produces a voltage across the electrodes. That voltage is a function of the process flow rate.

In one type of magnetic flowmeter, the electrodes are electrically insulated from the fluid to be metered, by a dielectric material. Such an "non-wetted" electrode configuration is advantageous in handling troublesome process fluids such as corrosive fluids, sewage and slurries which could damage and corrode the electrodes if in contact therewith.

In flowmeters having non-wetted electrodes, the electrodes are either embedded in the flowtube or disposed on the exterior surface thereof. Either electrode configuration has problems associated therewith. For example, U.S. Pat. No. 4,658,652, Picone et al., discloses a flowmeter having a spool-shaped flowtube formed of a ceramic material and having a pair of electrodes disposed on the exterior surface thereof. The thickness of the ceramic material results in a weak signal at the electrodes, requiring greater amplification and processing of the signal. A reduction in the amount of material separating the electrodes from the process fluids increases the signal strength but decreases the structural integrity of the flowtube and its ability to withstand pressure exerted thereon by the process fluid.

Flowmeters in which the electrodes are embedded within the wall of the flowtube present unique manufacturing problems. For example, Japanese Laid-Open Patent Application No. 58-196419 discloses a method of manufacturing flowtubes characterized by forming an electrode, by a metalizing process, on the outer surface of a first tube of unfired ceramics, and fitting a second tube, also made of unfired ceramics, about the surface of the first tube. Both tubes are then fired together to form a whole unit. A disadvantage of this method is that voids or air pockets form intermediate the two tubes during the firing process. Such voids seriously jeopardize the integrity of the flowtube and its ability to withstand the pressure imparted thereto by the process. More importantly the voids may provide a path for process fluid to penetrate which renders the meter inoperable when the fluid reaches the electrodes.

International Patent Application WO87/01197 discloses a method for manufacturing a ceramic measurement tube in which powdered green ceramic material is placed in a mold with a pair of platinum wire grids located at specific positions. The unfired ceramic material is then compressed and fired. Such a method has several disadvantages. First, the precise placement of the platinum wire grids in a mold of raw ceramic material is very difficult. If the grids or electrodes are not diametrically opposed as precisely as possible, inaccurate flowtube measurements will result. Second, the use of a wire grid results in a relatively small electrode area and a correspondingly weaker signal. Third, platinum is a relatively expensive material and will substantially increase the production cost of the tube.

Accordingly, it is desirable to manufacture a flowtube for use with a magnetic flowmeter which is truly monolithic, with no seams exposed to the process fluid, and in which the electrodes are disposed in close proximity to, but not in contact with, the process fluid flowing therethrough.

A problem associated with both flowmeters having wetted electrodes and those having and non-wetted electrodes involves zero offsets present in the output flow signal of the flowmeter. Such offsets appear as voltages across the electrodes, despite the absence of any fluid flow through the flowmeter which, in an ideal flowmeter, should cause an output flow signal of zero volts. Zero offsets add an error component into the output flow signal from the flowmeter.

When a magnetic field intersects a process fluid flowing through the flow tube at right angles to the magnetic field, an electric field is induced in the process fluid extending between the electrodes. This electric field causes charges to move in the electrodes and their respective leads. Such movement of charges is detected typically by processing circuitry and is desirable and necessary for proper operation of the flowmeter. However, the physical arrangement of the electrodes and leads, in conjunction with the conductive process fluid and the dielectric portion of the flow tube, if any, forms a pick-up loop that is also sensitive to the changing magnetic field. The pick-up loop is essentially a collection of conductors and insulators located inside, outside and within the walls of the flow tube. Any magnetic flux lines which penetrate this pick-up loop cause a voltage to be induced across the electrodes, when the magnetic field changes directions. This induced voltage is manifest as a series of induction spikes present in the signal output of the flow meter, even when the process fluid flow rate is zero.

Previous attempts have been made to insulate the pick-up loop from the lines of magnetic flux and thereby reduce the so called "zero offset voltage" present in the output signal of the flowmeter. In particular, an electromagnetic flowmeter model M2800 commercially available from the Foxboro Company, Foxboro, Mass., 02035, includes a positioning screw for mechanically positioning the plane of the electrode leadouts relative to the magnetic field. By aligning or substantially aligning the plane of the pick-up loop with the magnetic field, the amount of magnetic flux intersecting the pick-up loop is minimized. Accordingly, the amount of zero offset is proportionally minimized.

The alignment of the pick-up loop can be initially adjusted, however, there are installation and process factors which can unbalanced the loop with the magnetic field. In addition, such mechanical devices often add complexity and cost to the flow meter.

In the wetted electrode flowmeters, a similar pick-up loop can form. The geometry of the loop is controlled by the tube design and assembly. Also, the electrical center of the electrodes can move over time, after installation, due to the process coating part of the contact surfaces. Consequently, the alignment of the loop with the magnetic field also changes. With larger flanged flowmeters, eddy currents are created in the mounting flanges and adjacent pipe flanges that cause slight distortions in the magnetic field. These eddy currents and distortions can also change with time as rust forms on the flange bolt holes for example. As a result, the alignment of the pick-up loop with the magnetic field likewise changes.

It is, therefore, an object of the present invention to provide an electromagnetic flowmeter which can accurately measure the flow rate of a fluid passing therethrough.

A further object of the present invention is to provide a monolithic flow tube for use in electromagnetic flowmeter for measuring fluid flow rates.

Another object of the present invention is to provide an electromagnetic flowmeter in which the amount of magnetic flux intersecting the pick-up loop of the flowmeter is adjustable.

BRIEF SUMMARY OF THE INVENTION

The above and other objects are achieved in accordance with the present invention which, according to a first aspect, provides a flowtube for use in an electromagnetic flowmeter comprising a tubular flow conduit having a dielectric portion through which fluid is adapted to flow, an electrode means capacitively coupled to the interior of the flow conduit through the dielectric portion, and means for electrically coupling the electrodes to the exterior of the flow conduit.

According to one embodiment of the present invention, the flowtube comprises a tubular inner conduit formed of dielectric material, electrodes means adjacent the exterior surface of the inner flow conduit and capacitively coupled to the inner flow conduit, and an outer layer of ceramic material adjacent the exterior surface of the inner flow conduit and the electrode means. The inner flow conduit, electrode means and outer ceramic layer are sintered together to form a monolithic flowtube body.

The dielectric material from which the inner flow conduit is formed is of an improved purity, having a reduced number of mobile ions at high temperatures. The electrodes means are applied as a viscous conductive paste mechanically deposited in a predetermined electrode pattern onto the exterior surface of the inner flow conduit at selective areas.

In another embodiment, the electrodes are formed of a refractory metal and the inner flow conduit, electrodes and outer ceramic layer sintered together in a reducing atmosphere to form a monolithic flowtube body. In still another embodiment, the inner flow conduit comprises a dielectric material having a dielectric loss tangent $\delta$ of less than 0.002 at 10 Hz between $-40°$ C. and $200°$ C. In yet another embodiment, the inner flow conduit comprises a dielectric material having a relaxation conductivity, $\sigma_r$, of less than $10^{-12}$ per ohm·cm at $200°$ C., 50 milliseconds after a polarizing voltage is applied or removed from the dielectric material.

A second, equally important aspect of the present invention provides a method of manufacturing a flowtube for use with an electromagnetic flowmeter comprising the steps of forming a dielectric material into a substantially tubular conduit, depositing a conductive material to the exterior of the tubular conduit at selective areas, forming an outer layer of ceramic material over the tubular conduit and conductive material, and firing the components simultaneously into a monolithic body. The method may also include the additional step of exposing parts of the selected areas of conductive material and coupling an electrical lead therewith.

A third, equally important aspect of the invention provides an electromagnetic flowmeter comprising a fluid carrying conduit extending longitudinally along a first axis, a magnetic field source for creating a time varying magnetic field passing through the conduit and the fluid, electrode means coupled to the conduit for detecting a signal generated by motion of the fluid through the magnetic field, and means for electrically altering the average direction of the magnetic field relative to the first axis so that the signal detected by the electrode means is substantially zero when the velocity of the fluid through the conduit is approximately zero.

According to one embodiment of the invention, the magnetic field source comprises a pair of pole pieces disposed diametrically opposite each other about the exterior of the conduit and formed of a ferrous material. The magnetic field source further comprises a pair of primary current carrying windings, one winding disposed adjacent each of the pole pieces, for at least partially generating the magnetic field emmitted by the pole pieces. A primary circuit coupled to the primary windings applies current to the primary windings.

In another embodiment, the means for altering comprises a plurality of secondary current carrying windings, at least one secondary winding disposed adjacent each of the pole pieces, for partially generating the magnetic field emmitted by the pole piece. A secondary circuit means supplies current to the secondary windings.

In another embodiment of the invention, the flowmeter further comprises a measuring circuit coupled to the electrode means for receiving and processing the induced signal detected by the electrode means. In still another embodiment, the secondary circuit means is responsive to the measuring circuit and supplies current to the secondary coils according to the induced signal processed by the measuring circuit means.

The foregoing and other features, objects and advantages of the invention will be more fully understood by reading the detailed description below, in conjunction with the drawing.

DETAILED DESCRIPTION

Figure 1:
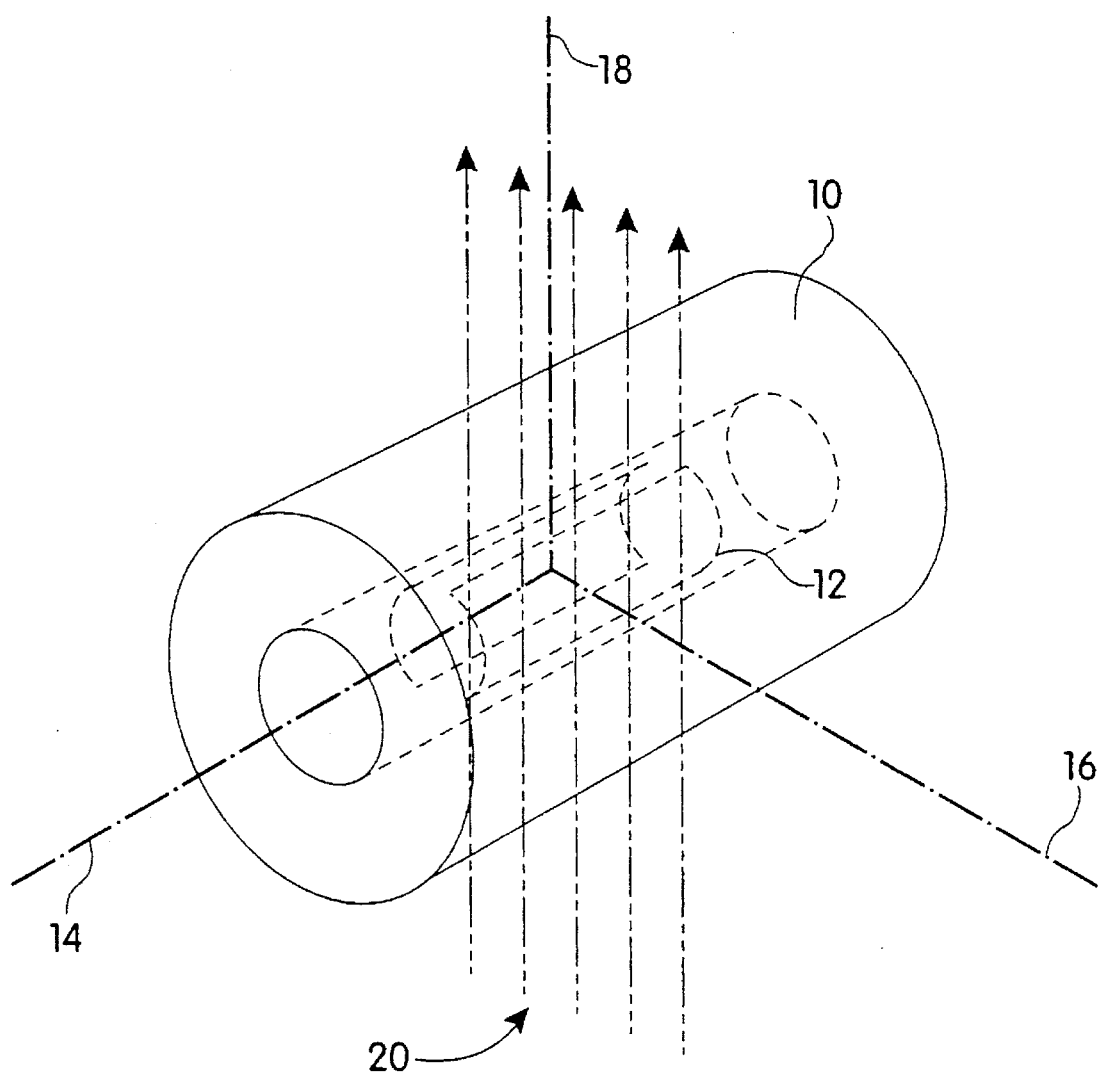
FIG. 1 is a perspective view of a flowtube illustrating the relationship of the magnetic field to the direction of fluid flow and the electrodes.

With reference now to the drawings, and more particularly to FIG. 1 thereof, a cylindrical flowtube 10 in accordance with a first aspect of the present invention is shown. Flowtube 10 has a longitudinal axis 14 which is also the axis along which fluid flows through flowtube 10. A pair of substantially arcuate electrodes 12 are disposed within the walls of flowtube 10 and are diametrically opposed to one another along the transverse axis 16, as shown in phantom. Electrodes 12 are buried within the walls of flowtube 10 and are hereinafter. A magnetic field, represented by flux lines 20, extends substantially parallel to axis 18 and is substantially mutually perpendicular to the longitudinal axis of flowtube 10 and the transverse axis along which the electrodes 12 are placed. The magnetic field is generated by an electromagnet and its associated circuitry (not shown).

In operation, each electrode 12 forms one plate of a pair of capacitors whose dielectric is the dielectric material of the flowtube and which share as their other plate the fluid being metered. The electrodes act as a capacitance-sensor to detect the voltage induced in the fluid when it intercepts the magnetic field whose flux lines 20 are normal to the flow direction.

The volumetric rate of fluid flow through flowtube 10 may be calculated using Faraday's Law of Induction. According to Faraday's Law, the voltage induced across any conductor as it moves at right angles through a magnetic field will be proportional to the velocity of that conductor. Accordingly, the voltage induced across electrodes 12 is proportional to the average velocity of the fluid and, hence, its average volumetric rate. Thus, coupling appropriate amplification and processing circuitry to electrodes 12, the flow rate of a fluid through flowtube 10 may be accurately determined.

Figure 2A:
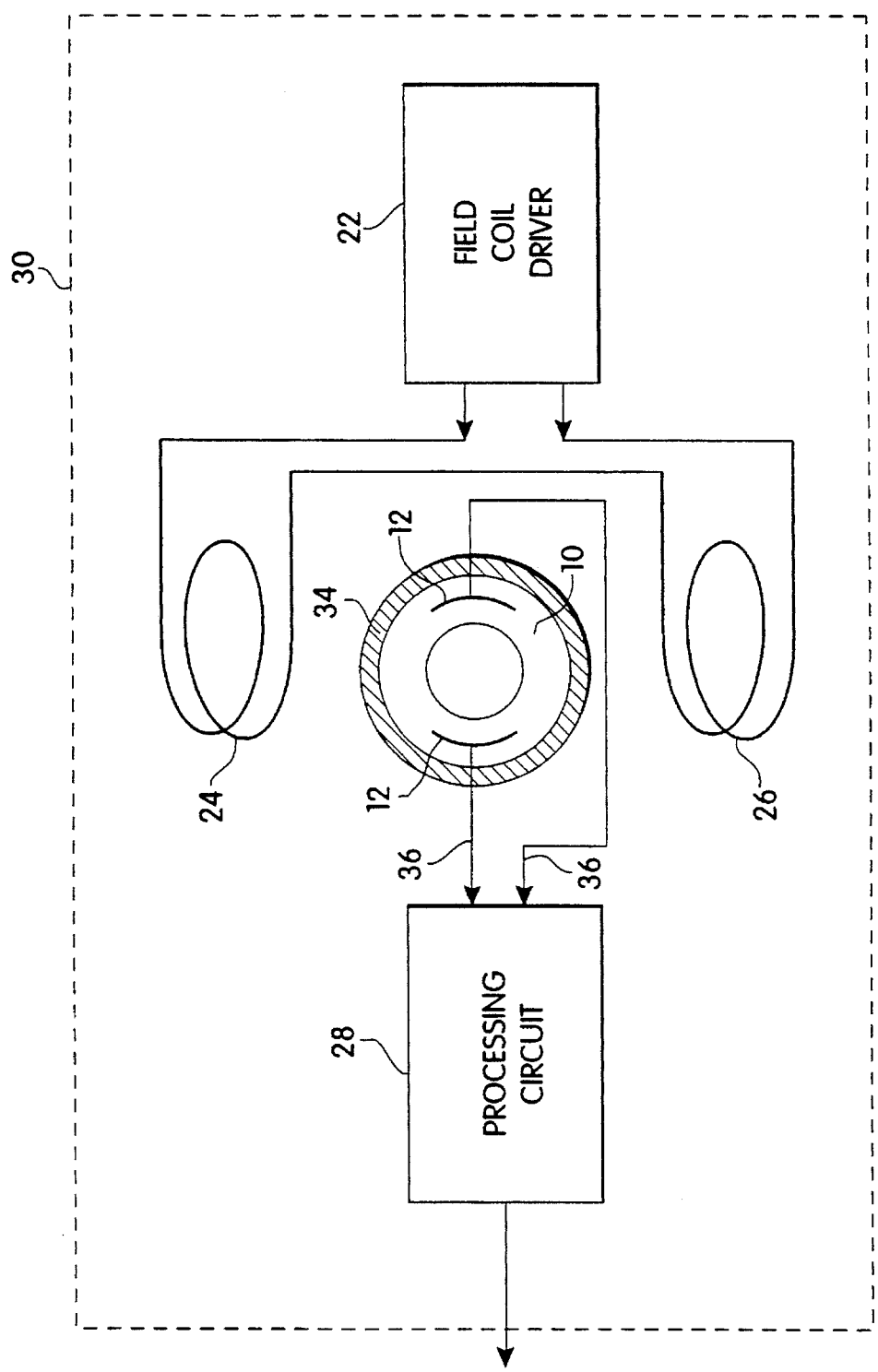
FIG. 2A is a block diagram of an electromagnetic flowmeter according to the present invention.

Referring to FIG. 2A, a block diagram of a magnetic flowmeter 30 in accordance with the present invention is illustrated. Flowmeter 30 comprises a flowtube 10 made of a preferably ceramic dielectric material having a pair of elongated, arcuate electrodes 12 embedded not in contact with the process fluid, as explained therein. Electrodes 12 are coupled to a processing circuit 28 by leads 36 which extend through flowtube 10. A part of leads 36 may be implemented with a twisted pair of coaxial cables. Flowtube 10 may have a metallic shield 34 surrounding its exterior surface, with apertures through which the leads 36 project.

Flowmeter 30 further comprises a field coil driver 22 which drives a pair of conventional field coils 24 and 26 which are wound around a ferrous core (not shown) positioned on opposite sides of flowtube 10. Field coil driver 22 comprises conventional electronic circuitry for driving field coils 24 and 26, such circuitry being well-known in the art.

In one embodiment, field coil driver 22 may include an oscillator coupled to a voltage-to-current converter, a current amplifier and other associated circuitry.

The flowmeter processing circuit 28 comprises electronic circuitry for detecting the flow signal from electrodes 12 and converting it into a usable output which may be supplied to a display unit or computer for central control of a processing system. The elements of processing circuit 28 are well-known in the art.

We have discovered a problem associated with non-wetted electrodes involving the dielectric relaxation characteristics of the material separating the electrodes from the process fluid. In particular, when the magnetic field changes, a voltage is induced across the dielectric material between the electrodes and the process fluids. This voltage polarizes the dielectric material and causes mobile ions to migrate as dictated by the impressed electric field. When the induced voltage is removed, the mobile ions reverse direction causing a detectable "relaxation" current which is manifest as a zero offset in the output flow signal of the flowmeter. In many dielectric materials, the amount of ion migration increases exponentially with temperature in the range of interest, i.e. −40° C. to 200° C. As a result, the voltage offsets present in the output flow signal increase at higher temperature and render the flow signal unreliable without external circuitry to compensate for the increased zero offset. At the higher temperatures in the range of interest, the effect can be so great that compensation is impractical.

Figure 3:
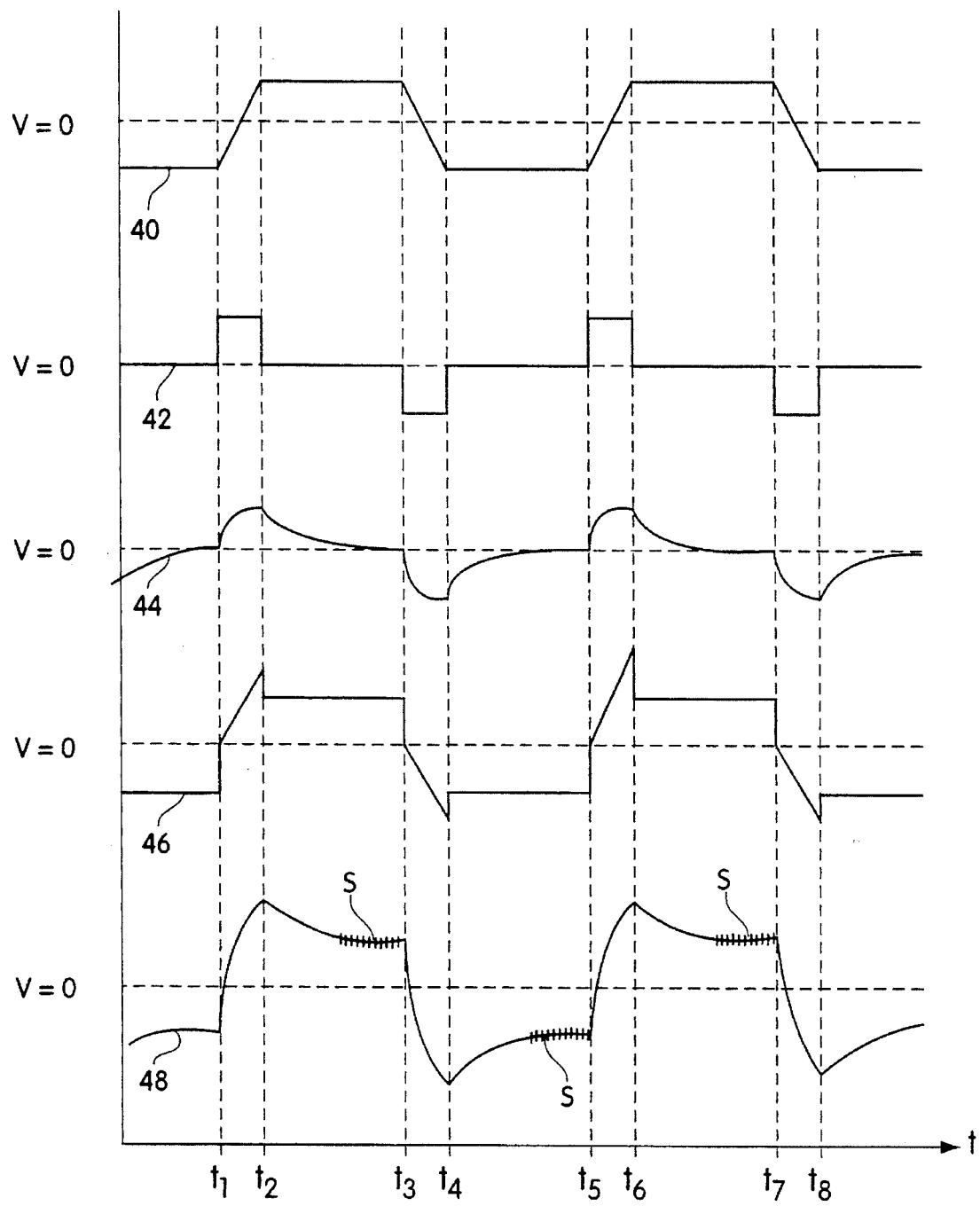
FIG. 3 is a timing diagram illustrating the various signals present in the circuit of FIG. 2A.

Referring to FIG. 3, a timing diagram illustrating the various signals present in flowmeter 30, is illustrated. As shown in FIG. 3, signal 40 is a clipped triangle wave typical of the coil current induced in field coils 24 and 26 by field coil driver 22. Signal 40 is a pulsed DC current of relatively low frequency, usually 2 to 20 Hz, with 5–10 Hz being typical for use in the present invention. Signal 40, therefore, also represents the amplitude and frequency of the magnetic field which intersects flowtube 10.

In an ideal flowmeter, Faraday's Law of Induction predicts that the electrodes 12 will sense a voltage amplitude similar to signal 40, which, during periods when the direction of the magnetic field is constant, i.e. $t_2$–$t_3$, $t_4$–$t_5$, and $t_6$–$t_7$, may be approximately represented by Equation 1 below. In Equation 1, $V_{40}$ represents the amplitude during one, of the above-identified time intervals of interest, u represents the velocity of fluid flow, B represents the magnetic field intensity, and d represents the internal diameter of the flowtube.

$$V_{40} = uBd \qquad \text{Eq. 1}$$

For a given flowmeter where B and d are constant by design choice, the amplitude of the electrode signal is directly proportional to the process fluid flow rate. However, in a non-ideal flowmeter, induction spikes cause dielectric relaxation offsets and the shape of the electrode signal deviates from that of signal 40, as explained hereinafter.

Referring again to FIGS. 1 and 2A–B, when a magnetic field intersects a process fluid flowing at right angles to the magnetic field, an electric field is induced in the process fluid extending between the electrodes 12 in flowtube 10. This electric field causes charges to move in electrodes 12 and lead 36. Such movement of the charges is detected by processing circuit 28 and is both desirable and necessary for proper operation of the flowmeter. However, the physical arrangement of electrodes 12 and leads 36, in conjunction with the conductive process fluid 11, form a pick-up loop 15 that is also sensitive to the changing magnetic field.

Figure 2B:
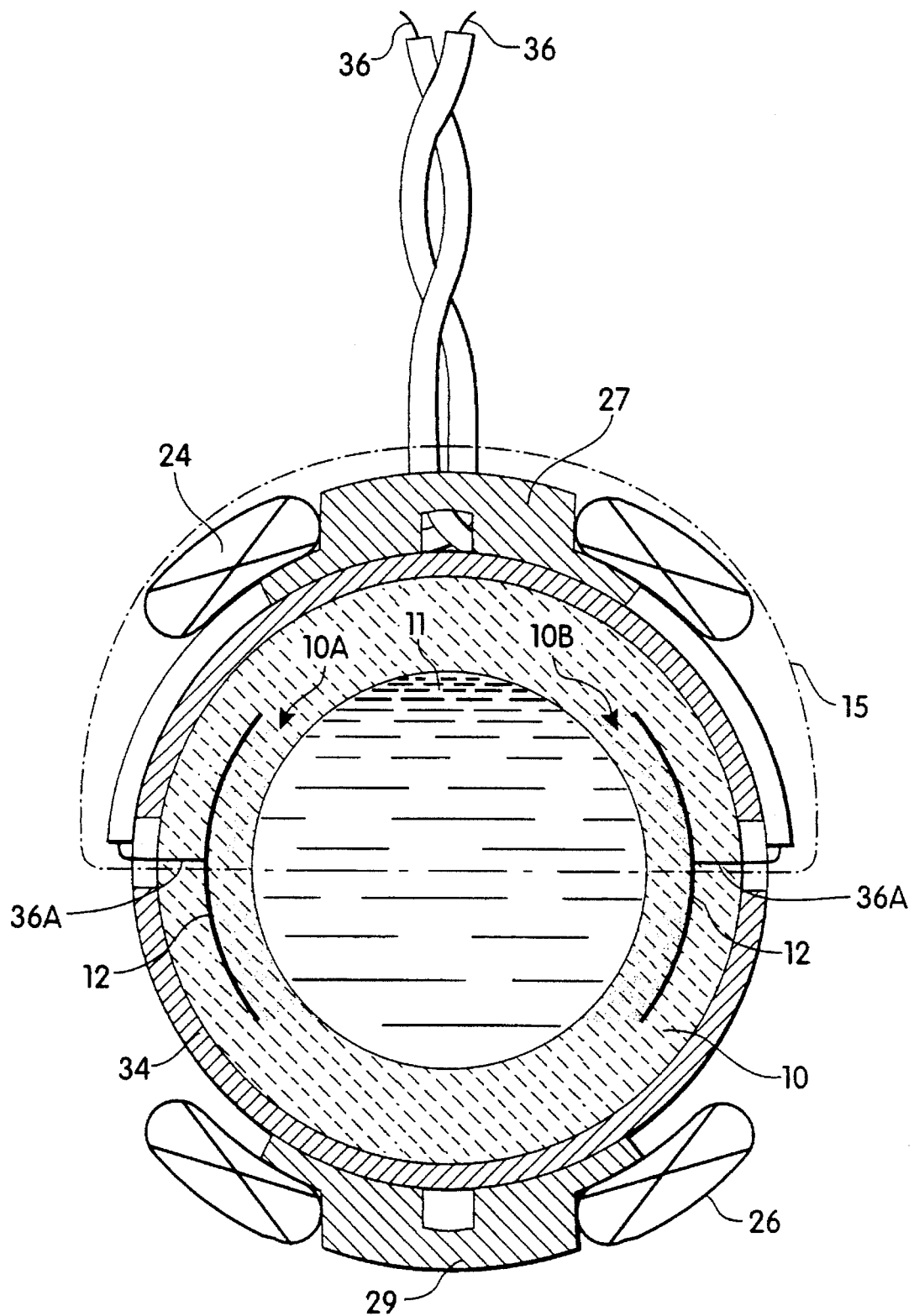
FIG. 2B is a partial, cross-sectional view of an electromagnetic flowmeter according to the present invention.

Referring to FIG. 2B, pick-up loop 15, indicated by the broken-line, has the shape of a hemicircle, the diameter of which is approximately the same as the outside diameter of flowtube 10. The pick-up loop is essentially a collection of conductors and insulators located inside, outside and within the walls of flowtube 10. In particular, pick-up loop 15 comprises the conductive process fluid 11, electrodes 12, the polarizable dielectric zones 10A–B of flow tube 10, lead out sections 36A of leads 36, and the untwisted length of leads 36.

Designers, by choice, try to minimize the magnetic flux intersecting pick-up loop 15, but some magnetic flux lines penetrate pick-up loop 15, and, when the magnetic field changes direction, cause a voltage to be induced across the electrodes 12. This induced voltage does two things. First, it is manifest as a series of induction spikes present in the signal output of flowmeter 30, even when the process fluid flow rate is zero. Second, it polarizes the dieletric in the zone between the electrodes and the process.

Signal 42 of FIG. 3 illustrates the pulse-shaped waveform of an induction spike pattern present at the output of flowmeter 30 when the process fluid flow rate is zero and when the dielectric material between the process fluid and the electrodes exhibits no polarization relaxation effects. In signal 42, the induction spikes, occurring between $t_1$–$t_2$, $t_3$–$t_4$, $t_5$–$t_6$ and $t_7$–$t_8$, are synchronous with changes in the coil current, signal 40. In addition, at time $t_1$ when signal 40 begins a positive-going transition, a positive induction spikes occurs and continues until time $t_2$ when the transition of signal 40 is completed, at which time signal 42 returns to zero. At time $t_3$, when signal 40 begins a negative-going transition, a negative induction spike occurs and continues until time $t_4$ when the transition in signal 40 is completed, at which time signal 42 again returns to zero. As can be seen from a comparison of signal 40 with signal 42, signal 42 is the time derivative of signal 40. The voltage amplitude of the induction spikes during the times in which the direction of the magnetic field is changing, i.e. $t_1$–$t_2$, $t_3$–$t_4$, $t_5$–$t_6$, $t_7$–$t_8$, can be expressed by Equation 2 below where $\phi$ represents the total flux passing through pick-up loop 15 and t represents time. A reduction in the slope of signal 40 results in a decrease in the amplitude of signal 42.

$$V_{42}=d\phi/dt \qquad \text{Eq. 2}$$

We have discovered that when an induction spike occurs, i.e., at $t_1$, $t_3$, $t_5$ and $t_7$ the spike polarizes the dielectric material between electrodes 12 and the process fluid by causing ions to migrate in response to the electric field in the dielectric material caused by the induction spike. When the induction spike of signal 42 returns to zero volts, i.e. at $t_2$, $t_4$, $t_6$ and $t_8$ the mobile ions reverse their movement through the dielectric material creating a relaxation current in the dielectric material and a voltage between electrodes 12. The voltage on the electrodes caused by the dielectric relaxation current becomes the zero offset component of the output flow signal of the flowmeter, as explained hereinafter.

Signal 44, illustrated in FIG. 3, is the voltage on electrodes 12 in response to excitation by an induction spike signal 42 for a flowtube 10 constructed of materials having sufficiently large numbers of mobile ions and consequent dielectric loss. A zero offset is caused by the polarization relaxation current within the dielectric material of flowtube 10. This relaxation current results from more than one physical mechanism in the dielectric material. A simple model of the relaxation current consists of several exponentially decaying processes as described in Equation 3 below.

$$f(t)=C_1e^{-k_1t}+C_2e^{-k_2t}+\ldots +C_ne^{-k_nt} \qquad \text{Eq 3}$$

In Equation 3, f(t) can represent either the current in a polarized region of the dielectric material, or the voltage output of processing circuit 28, since processing circuit 28 converts the current at the electrodes of flowtube 10 into a voltage. Signal 44 shows f(t) exaggerated for illustration, during the time intervals $t_2$–$t_3$, $t_4$–$t_5$, and $t_6$–$t_7$. The constants $C_1, C_2, \ldots, C_n$ are the relative amplitudes of the individual physical processes and the constants $k_1, k_2, \ldots, k_n$ are the corresponding time constants. The variable n is the number of contributing physical mechanisms occurring within the dielectric material.

Signal 46 of FIG. 3 illustrates the output of flowmeter 30 which is a summation of the induction spike signal 42, and an non-zero flow rate signal, similar in shape and frequency to the coil current, signal 40. The voltage amplitude of signal 46 during an interval of interest, i.e. $t_2$–$t_3$, may be expressed by Equation 4 below, in which all variables are defined the same as in Equations 1 and 2.

$$V_{46}=uBd+d\phi/dt \qquad \text{Eq. 4}$$

The value of $d\phi/dt$ is zero during time $t_2$–$t_3$ signal, and for a dielectric material without any loss characteristics, the induction spike occurring during time $t_1$–$t_2$ has no effect on $V_{46}$ during time $t_2$–$t_3$. The quality uBD alone contributes to $V_{46}$ during time $t_2$–$t_3$. Unfortunately, the zero offset resulting from the dielectric loss property of the material from which the flowtube 10 is formed, and which is present in signal 44, is likewise present in the non-ideal output flow signal 48, as illustrated in FIG. 3. As in signal 44, the zero offset caused by The dielectric relaxation current is exaggerated for the purpose of illustration. As can be seen from FIG. 3, output flow signal 48 is the summation of signal 44 and signal 40. The voltage amplitude of signal 48 during an interval of interest, i.e. $t_2$–$t_3$, may be expressed by Equation 5 below, in which all variables are defined the same as in Equations 1 and 3.

$$V_{48}=uBd+f(t) \qquad \text{Eq. 5}$$

The times of interest, in which the output flow signal 48 is sampled, occur between times $t_2$–$t_3$, $t_4$–$t_5$, and $t_6$–$t_7$, and are indicated in FIG. 3 by sampling points S. The values of signal 40 at a plurality of sampling points within a given time interval are averaged together. The resulting average value is then added to the absolute value of the average value from the next time interval and the sum of the average values divided by two. The resulting quotient represents the volumetric flow rate of the process fluid through the flowtube. It can be appreciated therefore that the signal caused by the dielectric relaxation current, and which is present during the respective times of interest, acts as a zero offset in output flow signal 48.

Briefly summarizing the signals of FIG. 3, signal 40 is proportional to the drive coil current and hence the magnetic field. Signal 42 illustrates induction spikes at zero flow rate for a flowtube having no dielectric loss characteristics. Signal 44 is similar to signal 42 except that the dielectric material has dielectric loss characteristics. Signal 46 illustrates induction spikes at a non-zero flow rate in a flowtube having no dielectric loss characteristics. Finally, signal 48 is similar to signal 46 except that the dielectric material from which the flowtube is made has dielectric loss characteristics.

By forming a flowtube from a dielectric material which has less of a tendency to polarize in the presence of an induction spike, the dielectric relaxation current will be reduced, as will the amplitude of the corresponding compound exponential decays. A decrease in amplitude of the zero offset will result in an output flow signal which more accurately represents the volumetric flow rate of the process fluid through the flowtube and enables more frequent flow rate measurements. The increased frequency of measurements facilitates more accurate and timely process control. Accordingly, it will be appreciated from the above explanation that the dielectric material and the dielectric relaxation characteristics thereof directly effect the zero offset in the output flow signal as well as the frequency with which the flow signal may be measured.

It is known that the dielectric loss of a material increases with the number of mobile ionic species present within the material. A dielectric material having fewer mobile ionic species will have less of a dielectric loss, and, as we have discovered, introduce less of zero offset into the output signal of the flowmeter. Further, the mobility of ionic species in many dielectric materials, such as ceramics, is exponentially related to the temperature of the material itself. As the temperature of the material increases, the mobility of the ions within the material increases exponentially and, accordingly, the dielectric loss of the material increases. For flowtubes used with processes in the temperature range of between −40° C. to 200° C., the ion mobility and resulting dielectric loss can become so great as to render useless the output flow signal from the flowmeter.

The number of mobile ions present in a dielectric material, such as a ceramic, increases with the concentration of impurities present in the material. These impurities can contain both mobile and immobile ions. The mobile ions primarily come from Group Ia of the Periodic Table of Elements. Of these, sodium and potassium are the most common mobile impurities in ceramic materials. As the purity of the dielectric material increases, the number of mobile ions decreases, as does the dielectric loss of the material and the resulting zero offset present in the output flow signal from the flowmeter. Accordingly, by using a dielectric material which has sufficiently low concentration of mobile ions, the dielectric loss of the material and the zero offset in the output signal of the flowmeter may be reduced, resulting in an output flow signal which more accurately reflects the flow rate of the process fluid through the flowtube.

A number of improved purity dielectric materials are commercially available for use as flowtube 10 which have reduced ion mobility and dielectric loss therein. Man-made materials, such as synthetic sapphire, a single crystal aluminum oxide, possess the desired purity, however, they are expensive. A ceramic material with dielectric properties suitable for use as flowtube 10 in the present invention is alumina commercially available under the tradename Vistal from Coors Ceramic of Golden, Colo. Another ceramic material suitable for use in the present invention as flowtube 10 is a spinel (magnesium aluminum oxide), referred to a type S-71 and commercially available from Trans-Tech, Corp. of Adamstown, Md. Also, alumina which is greater than 99.5% pure is suitable for use with the present invention.

Generally, any dielectric material, preferably ceramic, which has a combined total of less than 100 parts per million (PPM) by weight of impurities from Groups Ia of the Periodic Table is suitable for use for flowtube 10 of the present invention. A preferred dielectric material will have a combined total of equal to or less than 100 PPM by weight of sodium oxide ($Na_2O$) and potassium oxide ($K_2O$). It will be obvious to those reasonably skilled in the art that other high purity materials are available which are suitable for use with the present invention.

In addition to the above-described specification for mobile ion concentration, there are other measurable parameters to quantify the preferred dielectric characteristics of a material. In particular, a suitable dielectric material will have a D.C. conductivity which does not exceed $10^{-13}$/ohm·cm at 200° C. The second, a suitable dielectric material will have a dielectric loss tangent (tan δ) which does not exceed 0.002 at 10 Hz at 200° C. Third, 50 milliseconds after a constant polarizing voltage is applied to a suitable dielectric material at 200° C., the dielectric material will have a relaxation conductivity, $σ_r$, as expressed in Equation 6 below.

$$σ_r < 10^{-12} \frac{\text{Amperes}}{\frac{\text{Volts}}{\text{cm}} \cdot \text{cm}^2} \quad \text{Eq. 6}$$

The units of $σ_r$ in Eq. 6 are amperes of current, volts per centimeter of applied electric field, and square centimeters of dielectric area and are expressed as shown for the sake of clarity. It can be appreciated that Equation 6 may be mathematically simplified to $σ_r < 10^{-12}$ per ohm·cm. The value of $σ_r$ in Equation 6 describes the relaxation conductivity of the dielectric material and is particularly useful since it is related to the preferred method used to make flow measurements as described herein.

The above-described specifications for mobile ion concentration, D.C. conductivity, dielectric loss tangent, and relaxation conductivity are roughly equivalent for the purposes of this application, however among these specifications, the relaxation conductivity is preferred.

A flowtube 10 made of a dielectric material having the properties in accordance with the present invention will substantially reduce the zero offset component in the output flow signal due to reduced ion migration in the flowtube material and therefore provide greater accuracy in detecting the flow rate of a process fluid through the flowtube.

Figure 4A:
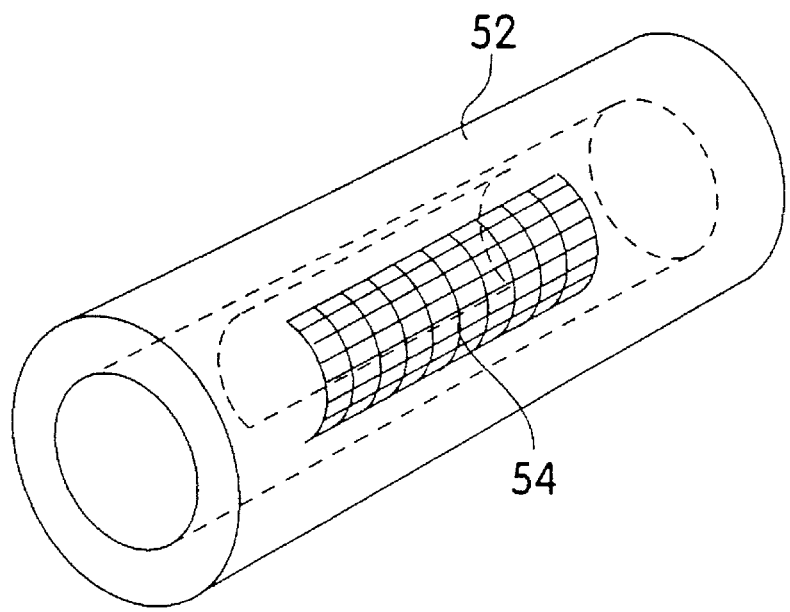
FIGS. 4A–B are perspective and axial views, respectively, of a partially completed flowtube in accordance with the method of the present invention.
Figure 4B:
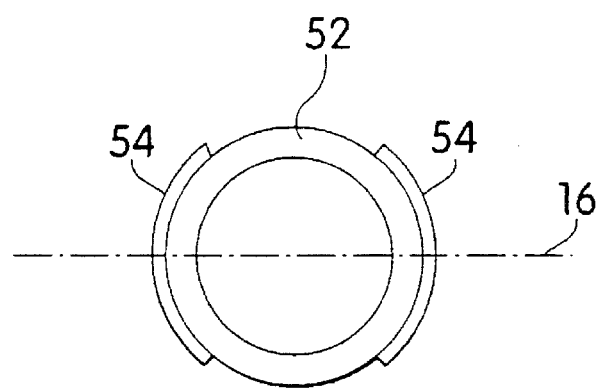

According to a second, equally important aspect of the present invention, a method for manufacturing a monolithic flowtube for use with an electromagnetic flowmeter is presented. Referring to FIGS. 4A–B, a method for manufacturing a monolithic flowtube 50 for use with an electromagnetic flowmeter includes the first step of forming an inner tubular conduit 52. Conduit 52 may be formed from alumina which is at least 99.5% pure or from one of the other previously described dielectric material suitable for use with the present invention. The dielectric material is placed, in a powdered form, in a mold and pressure applied to the mold to compress the powder into a substantially elongate cylindrical shape which is green or unfired. Such a mold may comprise a mandrel surrounded by an inflatable bladder for applying pressure to powdered ceramic material placed between the mandrel and the bladder.

Next, a pair of rectangular, arcuate electrodes 54 are formed on the exterior surface of conduit 52, only one of which is shown in FIG. 4A. Electrodes 54 are diametrically opposed to one another about transverse axis 16, as shown in FIG. 4B. Each electrode extends over an arc of approximately 30° to 150° about the perimeter of conduit 52. Each electrode may have a thickness of between approximately 0.0005 to 0.002 inches and nominally equal to 0.001 inches. Electrodes 54 are formed by mixing a conductive material, preferably a refractory metal, with a binding agent into a viscous, electrically conductive paste. The conductive paste is then mechanically deposited in a predetermined pattern onto the exterior surface of tubular conduit 52 at selected areas, as explained hereinafter.

The conductive paste may comprise a metal powder, having particles, typically a few tens of microns in extent. The conductive paste may further comprise, powdered glass frit, and organic binders such as cellulose and pine oil. The percent of metal powder by volume of unfired conductive paste may be greater than 80%. The binders give the conductive paste rheological properties suitable for subsequent screen printing and firing, as explained hereinafter. During firing, the organic binders burn off, ideally leaving no residue. In the present method, in which the conductive paste layer is buried under an outer layer of ceramic material, as explained hereinafter, the organic binders should be chosen so that any outgassing of the binder is complete before conduit 52 and the outer layer of ceramic are sintered together. If the organic binders within the conductive paste continue to outgas during sintering, cracks or splits in the exterior surface of the resulting sintered flowtube may result.

The metal used in the conductive paste which forms electrodes 54 must endure the firing process that sinters conduit 52 and the outer ceramic layer together. Such firing processes typically reach a maximum temperature of 1,650° C. Platinum, a noble metal, can endure such temperatures and may be further fired in any atmosphere, including air. Unfortunately, platinum is expensive since approximately two grams of platinum are required to form a pair of electrodes on a conduit having only a two inch diameter. Refractory metals such as tungsten, molybdenum and molymanganese alloy are cost effective alternatives to platinum, however, special firing conditions are required. Refractory metals must be fired in a reducing atmosphere, as explained hereinafter, to prevent the metal from forming a non-conductive oxide which cannot function as an electrode. In a preferred embodiment, the conductive paste is formed from molymanganese alloy since it possesses superior ceramic-to-metal bonding characteristics.

The conductive paste is mechanically deposited onto the exterior surface of conduit 52 in a predetermined pattern to form a pair of substantially arcuate electrodes 54. In one embodiment, the conductive paste may be screen printed onto conduit 52 using a conventional, two-dimensional screen printer which has been modified to print on cylinders, or a commercially available screen printer specifically designed for screen printing non-planar parts. In conventional screen printing, a paste is deposited in the path of a squeegee and forced through a screen pattern and onto the workpiece by the movement of the squeegee. In the present invention, conduit 52 is slipped over a mounting cylinder which is free to rotate and has an axis normal to the direction of squeegee motion. In operation, the motion of the squeegee forces paste through a screen pattern and onto the surface of conduit 52 which is in intimate contact with the screen. The squeegee is mechanically coupled to the mounting cylinder, so conduit 52 rotates as the paste is printed thereon. In this manner, both patterns of conductive paste which form electrodes 54 may be deposited on conduit 52 with one continuous motion of the squeegee across the screen pattern. The conductive paste is deposited in an electrode pattern with tolerances associated with normal screen printing, i.e. a few thousandths of an inch.

The conductive paste may further be deposited onto the exterior of conduit 52 with a paint wheel-type device or, if in a less viscous state, sprayed onto the exterior of conduit 52.

The conductive paste which forms electrodes 54 may be deposited onto conduit 52 in either a grid or solid pattern. A grid pattern facilitates ceramic-to-ceramic bonding between conduit 52 and the outer ceramic layer through the numerous apertures in the grid. Such ceramic-to-ceramic contact throughout the grid results in a stronger flowtube structure after firing. If the metal used in the conductive paste is platinum, a grid pattern is recommended since platinum, a noble metal, does not bond well to ceramic materials. If the conductive paste is made with molymanganese alloy, which bonds well to ceramics, a solid rectangular electrode pattern may be deposited onto conduit 52 without reducing the strength of the flowtube to unacceptable levels. A grid electrode pattern formed from a conductive paste made with molymanganese alloy will result in a flowtube having good structural integrity, as well as embedded electrodes.

The thickness of the conductive paste layer used to form electrodes 54 effects the integrity of both the electrode and the resulting flowtube. The process of screen printing the conductive paste onto conduit 52 will typically deposit a paste layer of approximately 20–25 microns in thickness. A paste layer having a thickness of greater than 100 microns, as may result from applying the conductive paste with a paint wheel, may be subject to smearing during the subsequent formation of the outer ceramic layer about conduit 52. Also, during the cooling phase of the firing cycle, the difference between linear expansion of the ceramic and metal layers may cause a flowtube having a thick electrode layer to crack. If the conductive paste is sprayed onto conduit 52, a thickness of less than 10 microns may result. Subsequent isopressing of the outermost ceramic layer has the potential of disrupting such a thin layer of conductive paste deposited on a green ceramic, which is held together only by surface tension forces of the organic binders.

It may be appreciated for the reasons stated above, that thin film deposition methods such as sputtering, chemical vapor deposition, and electron beam evaporation are not recommended for application of a conductive layer to conduit 52 since the resulting pattern will have a thickness of less than a few microns. Further, such methods are typically performed at near vacuum pressure which would cause the organic binders in the green conduit 52 to outgas and not only interfere with the deposition process but also possibly destroy the unfired conduit.

The surface resistivity for a screen printed and fired layer of conductive paste having a thickness of approximately 20 microns is 0.06 ohms/square for platinum, 0.1 ohms/square for molymanganese alloy, and 1 ohm/square for tungsten. Such surface resistivities are an order of a magnitude larger than that expected for their respective pure metals in the same shape and size, however, these resistivity values are still within an acceptable range. Since high impedance amplifiers in signal processing circuit 28 will typically be coupled to electrodes 54, even a highly resistive electrode layer with a surface resitivity as large as one million ohms/square will be acceptable for use in the present invention.

It will be obvious to those reasonably skilled in the art that any electrically conductive material, including semiconductor materials, may be used to form electrodes 54, as long as the material has a resistivity in the range of $10^{-6}$ ohms•cm. to $2.5 \times 10^3$ ohms•cm.

Figure 5A:
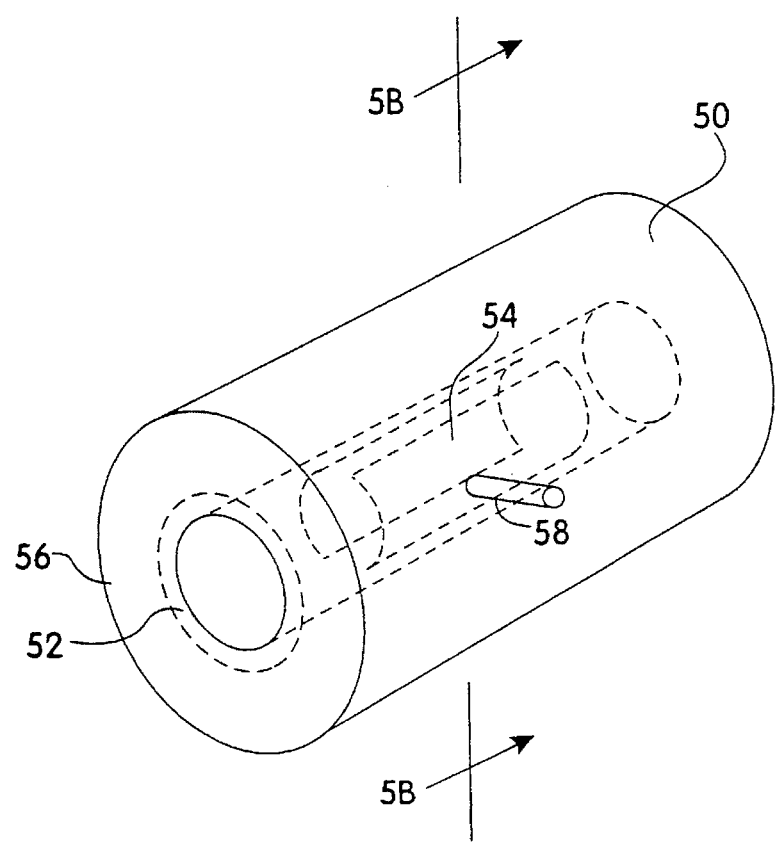
FIG. 5A is a perspective view of a completed flowtube in accordance with the method of the present invention.
Figure 5B:
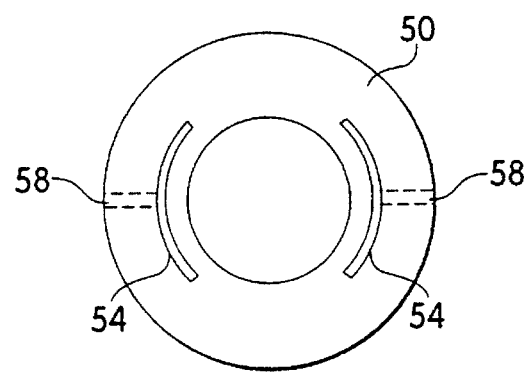
FIG. 5B is a cross-sectional view of the completed flowtube of FIG. 5A as seen along line 5B—5B.

In the next step of the inventive method, an outer layer 56 of ceramic material is formed over conduit 52 and electrodes 54. Outer layer 56 is formed by placing conduit 52 with electrodes 54 formed thereon into a mold and depositing more green ceramic material about the exterior thereof. The outer layer 56 may comprise the same dielectric material from which conduit 52 was formed. Pressure is then applied to the mold, typically by isostatic pressing using the above mentioned bladder, to form the powdered ceramic material into outer layer 56 which is integrally formed with inner conduit 52, as shown in FIGS. 5A–B. The resulting flowtube 50 comprises a single monolithic tube of unfired (green)

ceramic material having a pair of conductive electrodes 54 embedded therein.

Next, a pair of lead-outs 58, as shown in FIGS. 5A–B, are coupled to electrodes 54. While flowtube 50 is still in an unfired state, a single aperture may be machined in flowtube 50 in the proximity of each electrode 54 until the electrode is contacted. In one embodiment, lead-outs 58 comprise a mix of ceramic powder and a conductive paste, similar to that used to form electrodes 54, which is used to fill the apertures. The percent of metal in the mix should guarantee a reliable electrical contact with the electrodes 54 and provide mechanical continuity of the ceramic structure. The percent of metal by volume of fired conductive paste can vary between approximately 30–70%. The spots on the exterior surface of flowtube 50 where leads-outs 58 emerge may be further painted with conductive paste before firing. After firing, the resulting monolithic flowtube has a continuous ceramic structure with a pair of small cylindrical zones, a few millimeters in diameter, having enough conductivity to function as electrical leads for electrodes 54. A lead wire may then be coupled to each lead-out 58 on the surface of flowtube 50. The above-described lead-out embodiment is preferred since the resulting fired flowtube 50 has a strong, continuous ceramic surface which is not penetrated by any non-ceramic structure.

In a second lead-out embodiment, the inside of the apertures are painted down to the electrode with the same conductive paste used to make electrodes 54. Following firing of flowtube 50, as explained hereinafter, the lead-out 58 which in the second embodiment, may comprise a wire, metal pin or braided wire which is inserted into the aperture and secured therein by braising, soldering or with conductive epoxy.

As a final step in the method of the present invention, the unfired flowtube 50 is sintered or fired into a monolithic piece. Flowtube 50 is preferably fired in a reducing atmosphere, such as wet hydrogen, "cracked" ammonia, or forming gas which prevents oxidation of the conductive paste forming electrodes 54 and/or lead-outs 58 during the firing process. Flowtube 50 is typically fired up to 1650° F. The resulting flowtube has no seams into which the process fluid can invade and no voids or air pockets at the juncture of the inner conduit 52 with the outer layer 56.

A flowtube 50 produced in accordance with the method of the present invention is completely monolithic, includes a pair of embedded electrodes, and has dielectric characteristics which will reduce zero offsets induced in the flowtube during normal operational use. It may be appreciated, that a flowtube comprising a ceramic dielectric material in accordance with the first aspect of this invention and manufactured in accordance with the second aspect of this invention has superior structural and electrical characteristics which, when combined with the other known elements of an electromagnetic flowmeter, will provide superior performance and durability in a process control environment.

Figure 6:
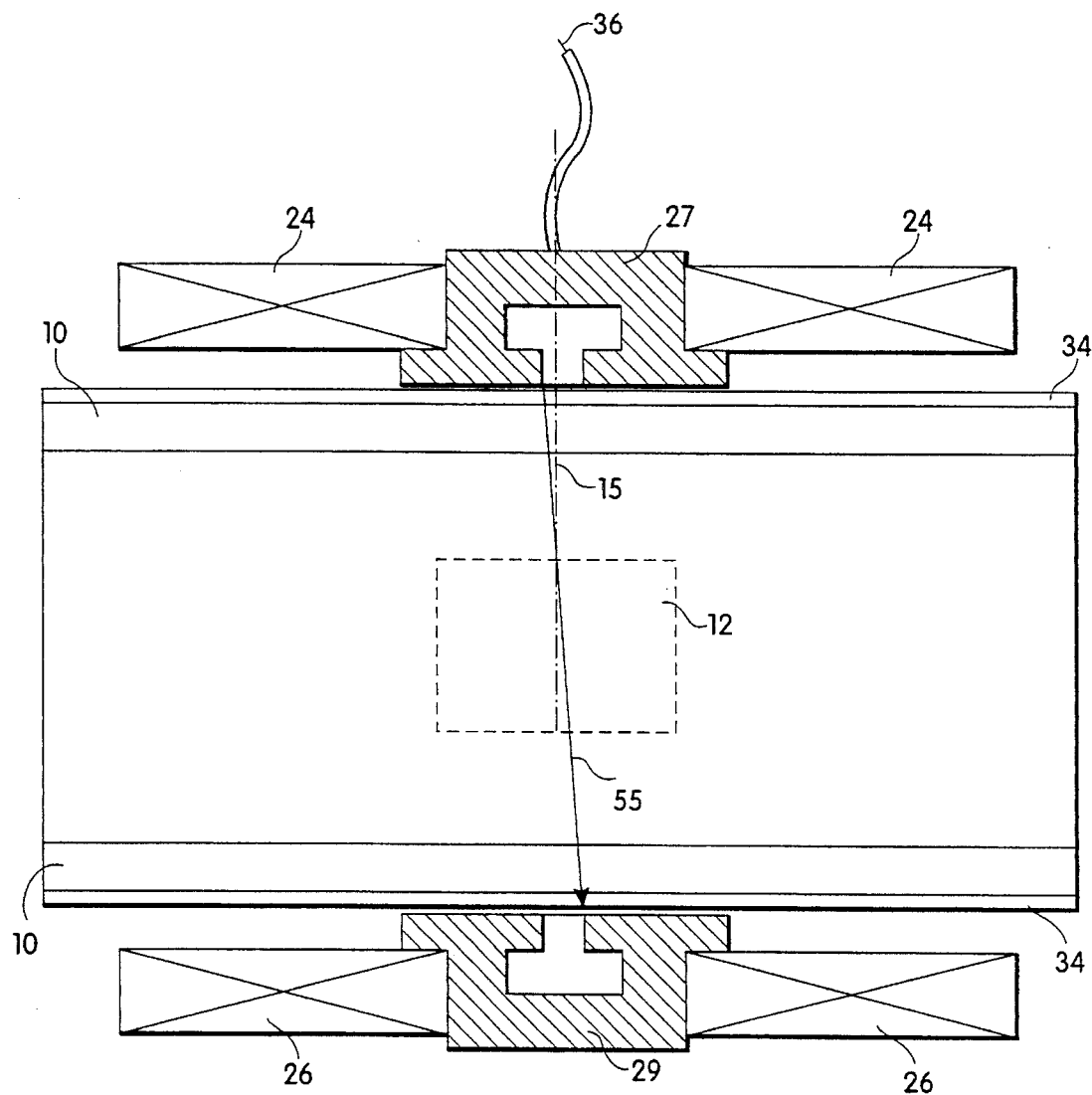
FIG. 6 is a cutaway view of the flowmeter of FIG. 2B illustrating the magnetic field vector and the plane of the pick-up loop.

According to a third, equally important aspect of the present invention, an electromagnetic flowmeter is disclosed in which alignment between the pick-up loop of the flowmeter and the average direction of the magnetic field can be adjusted to reduce the zero offset present in the output flow signal of the flowmeter. Referring to FIG. 6, a side cross-sectional view of the magnetic flowmeter of FIG. 2B is illustrated without process fluid 11. For the purposes of illustration, pick-up loop 15 is shown to exist in a plane, indicated by the broken dashed line, which is perpendicular to the longitudinal axis of flow tube 10. This illustration, however, is not meant to be limiting. Pick-up loop 15 may exist in three dimensions and may not be perpendicular to the longitudinal axis of the tube or the direction of fluid flow.

Figure 7A:
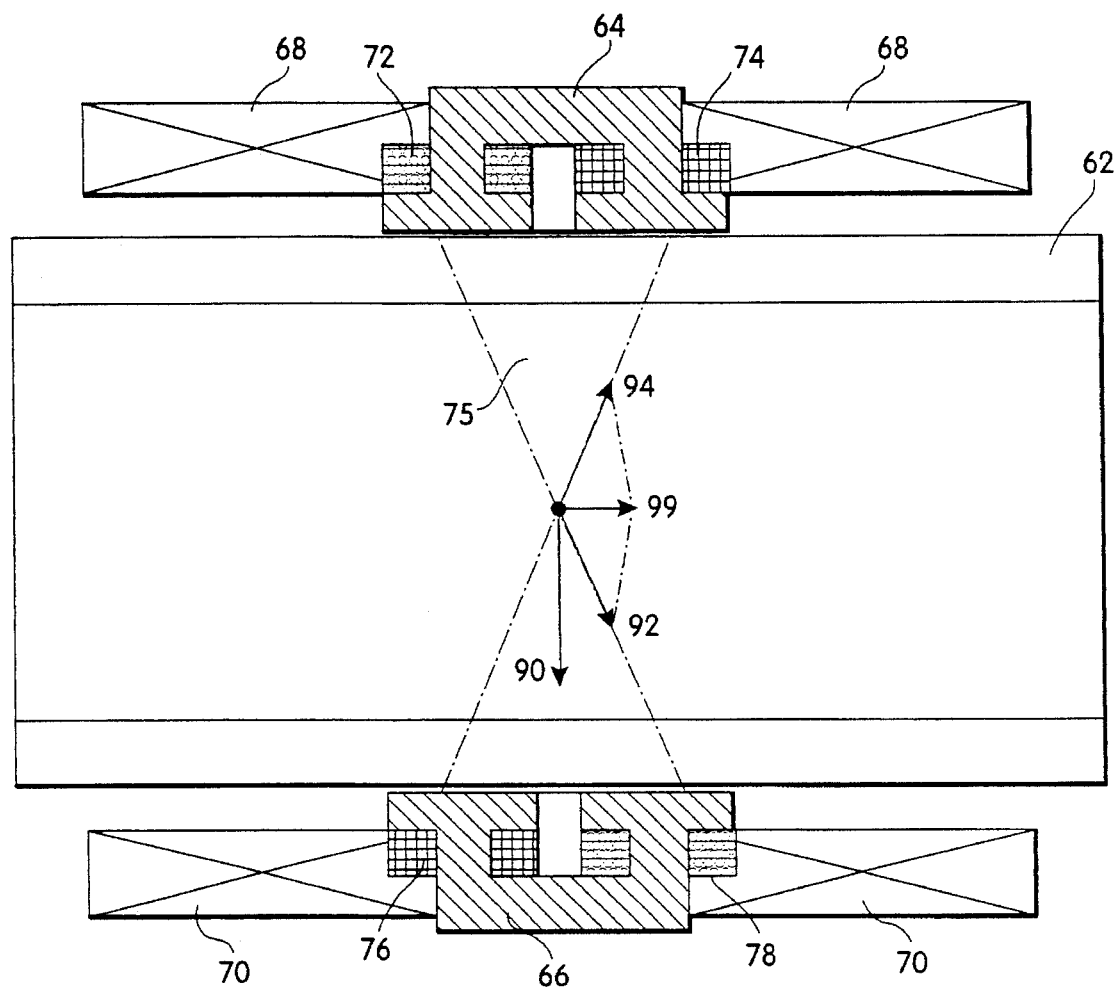
FIG. 7A is a side cutaway view of an electromagnetic flowmeter according to a first embodiment of the present invention illustrating the relationship between the drive and tilt coils and the average direction of their respective magnetic fields.

Vector 55, shown in FIG. 6, illustrates the average direction of the magnetic field resulting from the geometry of drive coils 68 and 70, as shown in FIG. 7A. As explained previously, flux lines of the magnetic field penetrate pick-up loop 15, and, when the magnetic field changes directions, cause a voltage to be induced across electrodes 12. This induced voltage is manifest as a series of induction spikes present in the output signal of the flowmeter, even when the process flow rate through the flow tube is zero.

The present invention provides an electromagnetic flowmeter in which the average direction of the magnetic field may be electrically directed into substantial parallel alignment with the pick-up loop. When the average direction of the magnetic field and the pick-up loop are aligned, little magnetic flux penetrates the pick-up loop, thereby minimizing the voltage induced across the electrodes and, ultimately, the magnitude of the induction spikes present in the output signal of the flowmeter.

Referring to FIG. 7A, a side cross-sectional view of an electromagnetic flowmeter 60 in accordance with the third aspect of the present invention is illustrated. Flowmeter 60 comprises a flowtube 62, a top pole piece 64, a bottom pole piece 66, a top drive coil 68, a bottom drive coil 70, top tilt coils 72 and 74, and bottom tilt coils 74 and 76. Flowtube 60 further comprises electrodes, leads, and associated circuitry, as explained hereinafter. Although not tangibly a part of the flowmeter 60, a pick-up loop plane 75, a general magnetic field vector 55, a primary magnetic field vector 90, and a pair of secondary magnetic field vectors 92 and 94, and a sum vector 98 are illustrated for the purposes of explaining the operation of flowmeter 60.

Flowtube 62 may have a monolithic construction, as previously described in accordance with the first or second aspects of the invention, in which the electrodes are disposed within the tube walls. Alternately, flowtube 62 may have any number of conventional constructions, including those having wetted or non-wetted electrodes. Top pole piece 64 and bottom pole piece 66 are disposed diametrically opposite one another about the circumference of flowtube 62 and are formed from a ferrous material. Pole pieces 64 and 66 may have a side, cross-sectional shape, as illustrated in FIG. 7A. The surface of each pole piece adjacent flowtube 62 may have a generally arcuate shape to accommodate the curved perimeter of flowtube 62. Top drive coil 68 is wound about top pole piece 64. Drive coil 68 may be a conventional field coil, the construction design of which is known to those reasonably skilled in the art. A coil of similar design and construction, bottom drive coil 70, is wound about bottom pole piece 66, as illustrated. A circuit drives coils 68 and 70, as explained in greater detail hereinafter with reference to FIGS. 8A–C.

When current is supplied to drive coils 68 and 70, top and bottom pole pieces 64 and 66 generate a primary magnetic field, the average direction of which is illustrated in FIG. 7A by primary magnetic field vector 90. It will be obvious to those reasonably skilled in the art that the direction and magnitude of vector 90 will vary according to the current supplied to coils 68 and 70. Typically, coils 68 and 70 will be supplied with a signal having a waveform similar to that of signal 40, illustrated in FIG. 3. Accordingly, the direction and magnitude of vector 90 will vary, in time, as a function of the drive coil current.

Typically, magnetic field vector 90 will be at a non-parallel angle with pick-up loop plane 75. The average direction of the magnetic field may be brought into substantial parallel alignment with pick-up loop plane 75 with a plurality of secondary coils wound about pole pieces 64 and 66. These secondary or tilt coils are driven by a separate tilt coil drive circuit, as explained hereinafter. By supplying to the tilt coils a current of different magnitude and phase than that supplied to the drive coils, the average direction of the magnetic field generated by the pole pieces may be shifted.

Figure 8A:
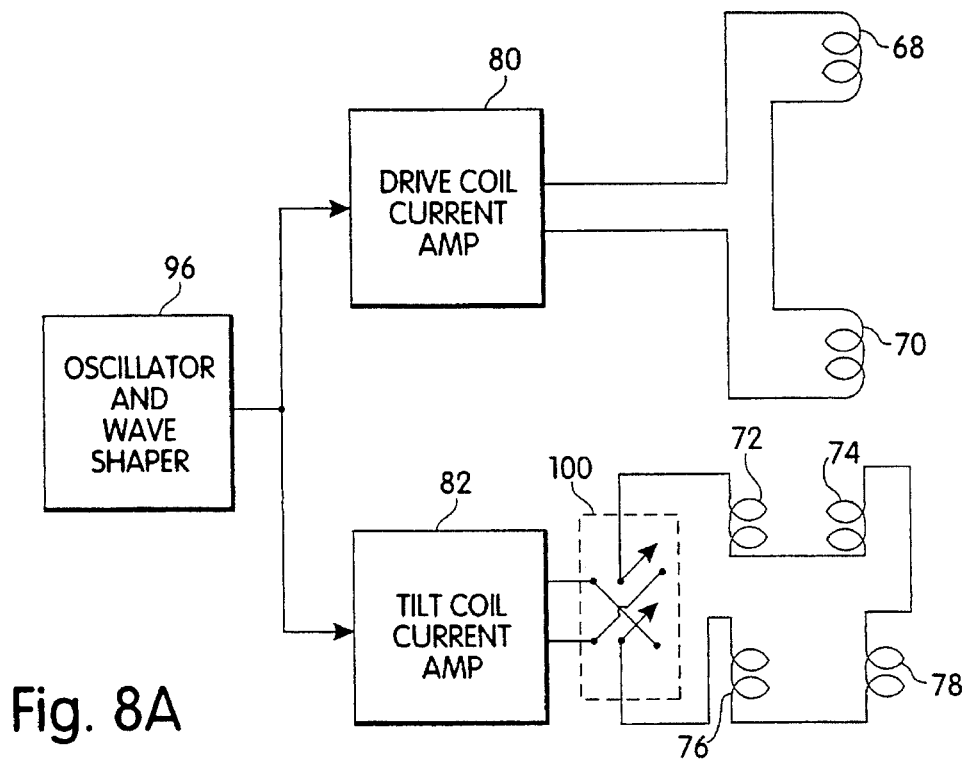
FIGS. 8A–C are schematic block diagrams of various embodiments of the drive and processing circuitry of the magnetic flowmeter in accordance with the invention.

In the embodiment illustrated in FIG. 7A, four tilt coils are utilized. First and second tilt coils 72 and 74, respectively, are wound about top pole piece 64. In a similar manner, third and fourth tilt coils 76 and 78, respectively, are wound about bottom pole piece 66. In the illustrative embodiment, tilt coil 72, 74, 76 and 78 are electrically coupled in series and driven by a tilt coil driver circuit, as illustrated in FIG. 8A and explained hereinafter. Although the tilt coils are wound in series, they are not wound with the same sense. The sense of a coil winding refers to the direction, i.e., clockwise or counterclockwise, in which the coil is wound, and, ultimately, the direction of the resulting magnetic field. In the illustrative embodiment, all four tilt coils can be wound from the same wire. However, coils 72 and 78 are wound in a counterclockwise direction while coils 74 and 76 are wound in a clockwise direction, or vice versa. In this manner, if all four coils are driven with a current having the same phase and magnitude, coils 72 and 78 will generate a magnetic field having an average direction characterized by vector 92, as illustrated in FIG. 7A, which will add to the average direction of the primary magnetic field, as characterized by primary magnetic field vector 90. Conversely, tilt coils 74 and 76 will generate a magnetic field having an average direction characterized by vector 94, as illustrated in FIG. 7A, which will subtract from the average direction of the primary magnetic field, as characterized by primary magnetic field vector 90. If the tilt coil currents are driven with the same waveshape as drive coils 68 and 70, but of a different amplitude, the average direction of the magnetic field may be tilted either upstream or downstream, depending on the phase of the current through the tilt coils.

The Primary magnetic field, characterized by vector 90, and the secondary magnetic fields, characterized by vectors 92 and 94, add according to the rules of vector addition. Vector 99 is the vector sum of vectors 92 and 94. Vector 99 acts either upstream or downstream approximately along the axis of flow tube 62.

Figure 7B:
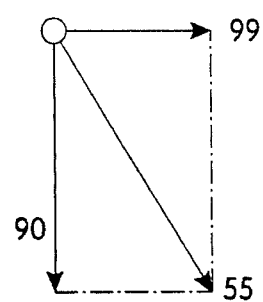
FIG. 7B is a diagram illustrating the primary and secondary magnetic field vectors and the resulting vectors.

Magnetic field vector 55 is the vector sum of vectors 99 and 90, as illustrated in FIG. 7B. The amplitude of the signal supplied to tilt coils 72, 74, 76 and 78, determines the angle at which the average magnetic field vector 55 deviates from the pick-up loop plane 75. The phase difference between the tilt coil current and the current driving the drive coil 68 and 70 determines whether the average magnetic field direction vector tilts upstream, i.e., with the direction of the fluid, or downstream, against the direction of the fluid. The phase difference between the current driving the tilt coils and the drive coil current is typically either 0°, i.e., in phase, or 180°, i.e. out of phase. If the tilt coil current and drive coil currents are in phase, magnetic field vector 55 will tilt upstream. Conversely, if the tilt coil current and drive coil currents are out of phase, magnetic field vector 55 will tilt downstream. Accordingly, by selectively adjusting the magnitude and phase of the tilt coil current relative to the drive coil current, the average direction of the magnetic field may be brought into alignment with the pick-up loop plane 75 so as to minimize the amount of magnetic flux penetrating the loop and causing zero offsets in the output flow signal of the flowmeter. The angle at which the magnetic field vector 55 deviates from the vertical axis is practically proportional to the tilt coil current for tilt angles of less than 10°.

Referring to FIG. 8A, a tilt coil driver circuit is illustrated as comprising an oscillator wave shaper circuit 96, drive coil current amplifier 80, tilt coil current amplifier 82, switch 100, drive coils 68 and 70 and tilt coils 72, 74, 76 and 78. The construction and function of circuit 96 and amplifier 80 are within the scope of those reasonably skilled in the arts. Typically, the circuit 96 will supply a clipped triangle wave to current amplifiers 80 and 82. Current amplifier 82 is similar in construction and function to current amplifier 80 except that the current provided therefrom is of smaller magnitude than that from current amplifier 80. Switch 100 may be implemented with a conventional DPDT switch and serves as a phase reversing element for reversing the phase of the oscillator signal.

In the circuit illustrated in FIG. 8A, the amplitude of the current driving the tilt coil may be adjustably set with a variable control (not shown) associated with current amplifier 82. The phase of the tilt coil drive current may be set manually with switch 100. In this manner, the amplitude and phase of the tilt coil drive current may be manually adjusted, typically while flowmeter 60 is being calibrated at its initial manufacture, or thereafter. By selecting a tilt coil current of fixed magnitude and polarity, the flowmeter may be calibrated to null out induction spikes in the output flow signal.

In FIG. 8A, tilt coils 72, 74, 76 and 78 could also be driven in parallel by amplifier 82.

Figure 8B:
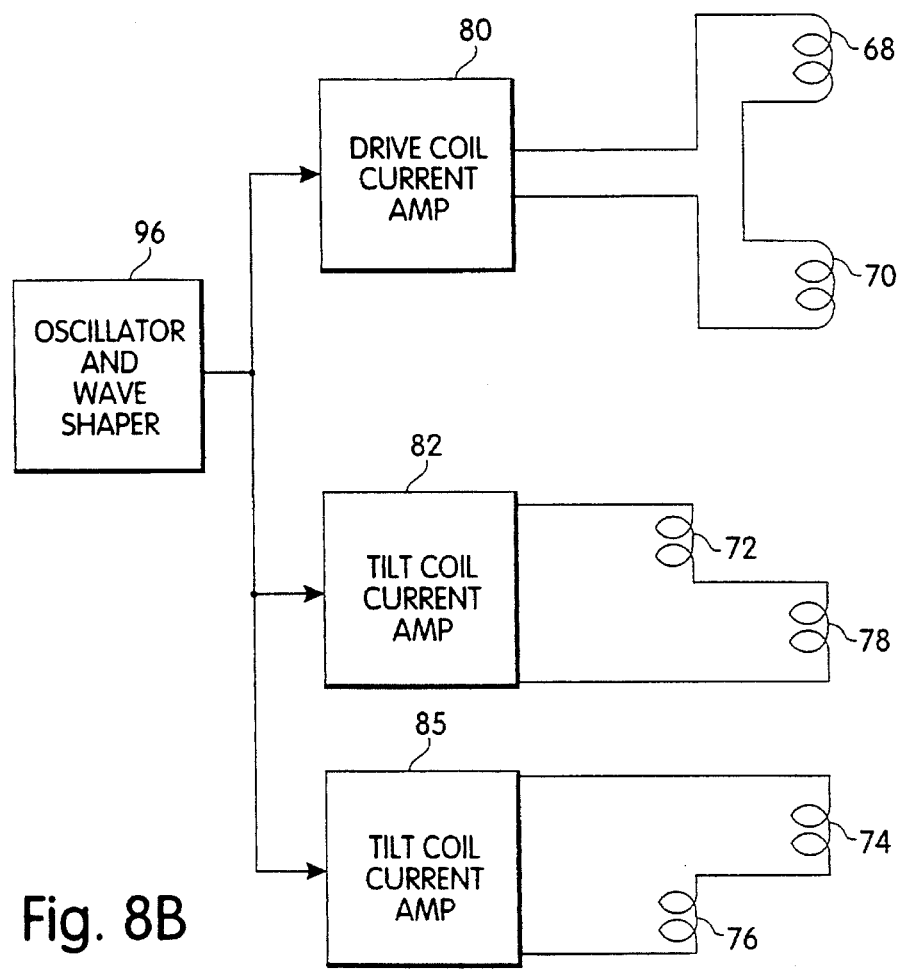

FIG. 8B illustrates an alternate embodiment to that disclosed in FIGS. 7 and 8A. In this embodiment, tilt coils 72 and 78 are driven by a first tilt coil current amplifier 82, while coils 74 and 76 are driven by a second tilt coil current amplifier 85. The direction of current supplied to The tilt coils causes tilt coils 72 and 78 to produce magnetic fields which reinforce one another and which oppose the magnetic fields produced by tilt coils 74 and 76.

Figure 8C:
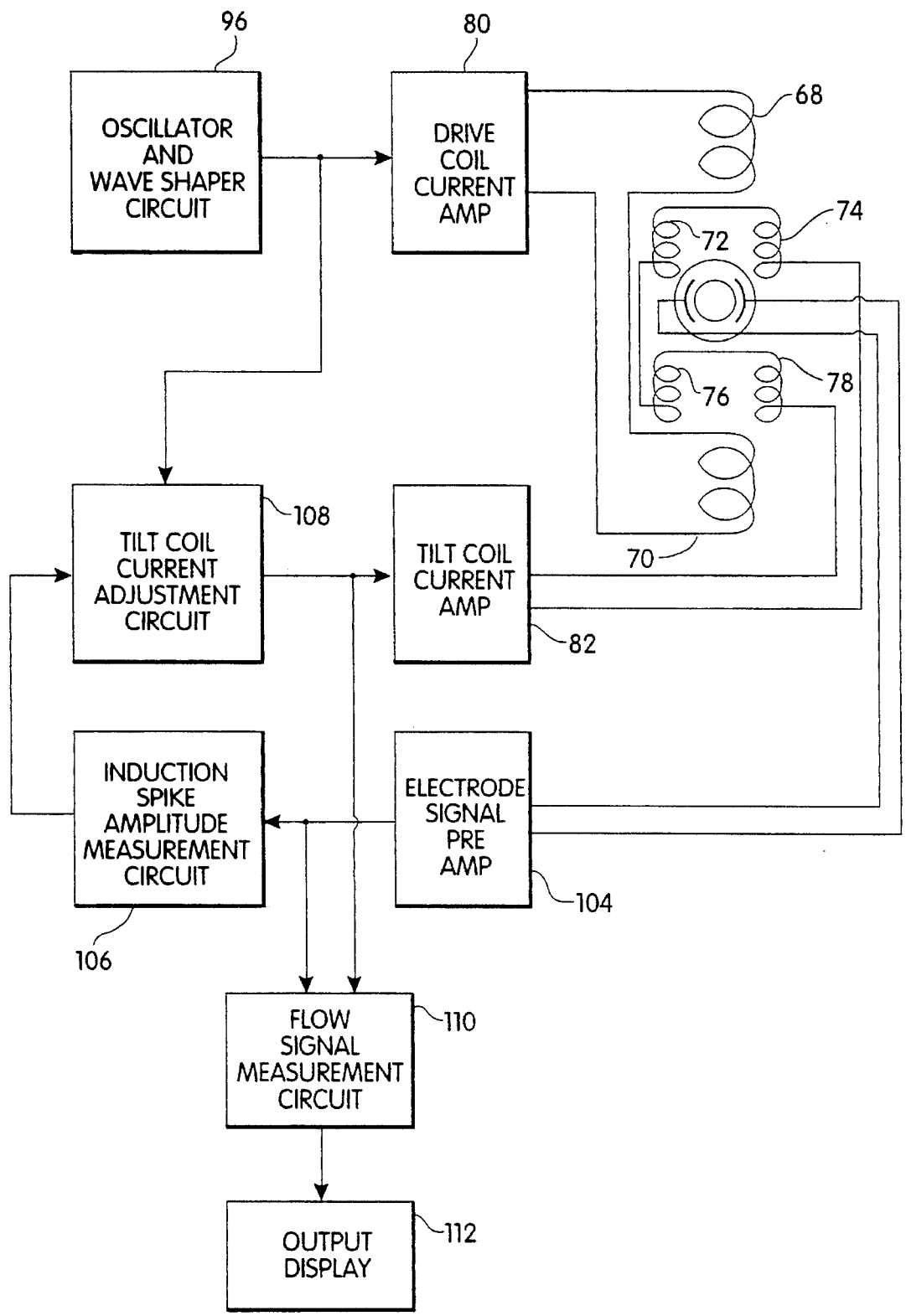

In another embodiment illustrated in FIG. 8C, the magnitude, polarity and phase of the tilt coil current may be continuously variable in response to the output of the flowmeter electrodes. In such embodiment, flowmeter 60 is continually self-calibrating so that any induction spikes detected in the output flow signal of the meter can be nulled out by making appropriate adjustments to the gain, polarity and phase of the current driving the tilt coils.

In the circuit illustrated in FIG. 8C, in addition to the oscillator/wave shaper circuit 96, the drive coil current amplifier 80 and the tilt coil current amplifier 82, the circuit comprises an electrode signal preamplifier 104, an induction spike measurement circuit 106, a tilt coil current adjustment circuit 108, a flow signal measurement circuit 110, and an output device 112. As in the circuits illustrated in FIGS. 8A–B, oscillator wave shaper 96 provides a clipped triangle wave to drive coil current amplifier 80 as well as to tilt coil current adjustment circuit 108. Current amplifier 80 excite drive coils 68 and 70, as previously described. Tilt coils 72, 74, 76 and 78 are excited by tilt coil current amplifier 82. However, in this embodiment, current amplifier 82 receives input from tilt coil current adjustment circuit 108 which, in turn, receives input from oscillator/wave shaper 96 and induction spike measurement circuit 106. Induction spike measurement circuit 106 receives input from electode signal preamplifier 104 which amplifies the signals received from the electrodes within the flow tube. Induction spike measurement circuit 106 contains the circuitry and logic for measuring the amplitude of an induction spike. Such circuitry would typically include a sample hold circuit for sampling the amplitude of the induction spike signal and one or more memory locations for storing other previously sampled induction spike amplitude values. Circuit 106 may further comprise circuitry for comparing the stored values to determine whether the amplitude of the induction spike is increasing or decreasing over a give time. The construction of such a circuit would be within the scope of those reasonably skilled in the arts. The outputs of tilt coil current amplifier 82 and electrode signal preamplifier 104 are further supplied to flow signal measurement circuit 110. The measurement signal generated by circuit 110 is supplied to output device 112.

The amplitude of the output signal of circuit 108 is generated so as to minimize the induction spike amplitude measured by measurement circuit 106. In this manner, the average direction of the magnetic field is altered continuously to bring it in alignment with the plane of the pick-up loop and thereby reduce the magnitude of induction spikes measured by the electrodes. Current adjustment circuit 108 may be implemented with a microprocessor software, and associated logic for implementing a comparison algorithm. Such an algorithm typically would compare previously sampled amplitudes of induction spikes and the amplitude and phase of the tilt coil current associated therewith to determine which tilt coil current amplitude and phase results in the smallest amplitude induction spike. The logic and circuitry necessary to implement such a comparison algorithm is within the scope of those skilled in the relevant arts.

Flow signal measurement circuit 110 receives the detected flow signal from preamplifier 104 as well as the output signal of adjustment circuit 108. In this manner, the decalibrating effects resulting from variations of the magnetic field, which are intended to minimize the induction spike, do not effect the flow signal measurement. The signal appearing at the output of measurement circuit 110 is the true representation of the flow rate through the flowmeter.

Figure 9:
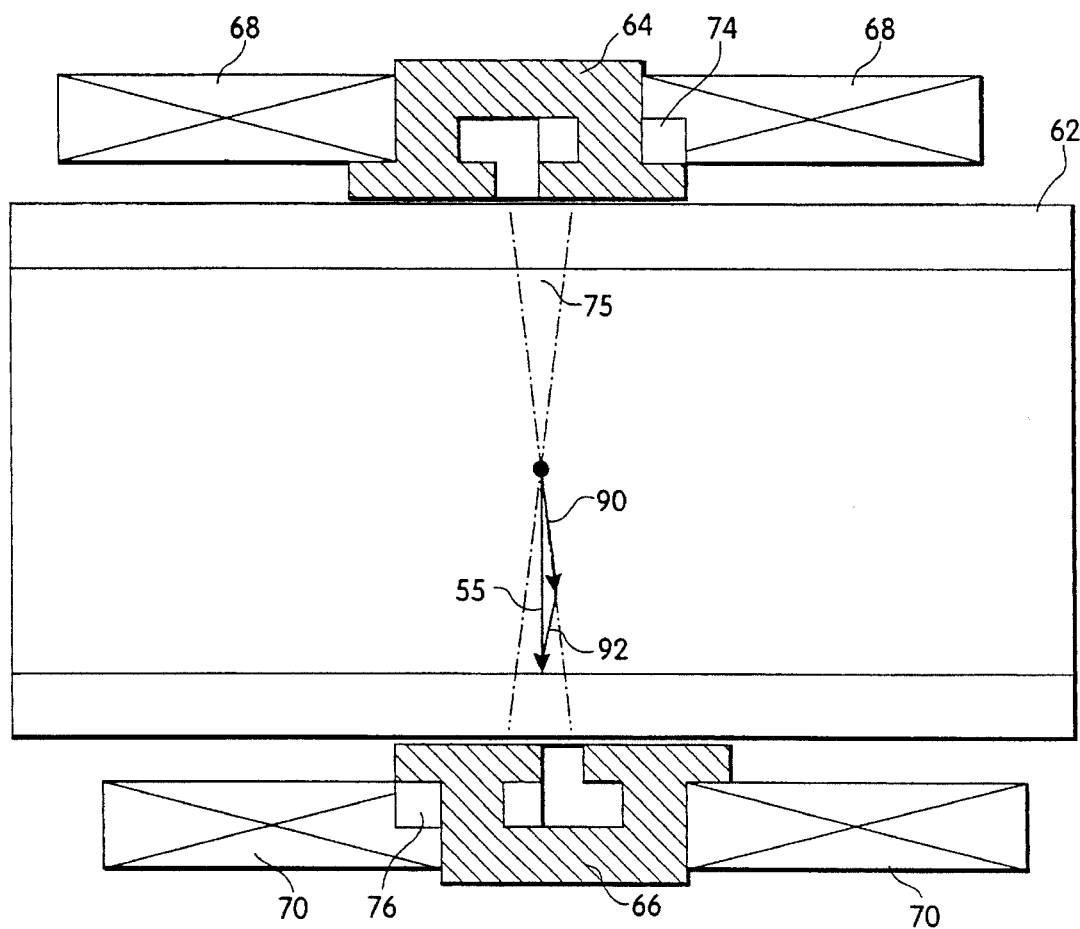
FIG. 9 is a side cutaway view of an electromagnetic flowmeter according to another embodiment of the present invention illustrating the offset relation of the pole pieces along the flowtube axis.

Referring to FIG. 9, a second embodiment of flowmeter 60 is illustrated. In this embodiment, flowmeter 60 is substantially similar to that disclosed in FIG. 7 except that pole pieces 64 and 66 are offset along the longitudinal axis of flowtube 62 by a predetermined distance. In this manner, the average direction of the magnetic field, as characterized by primary field vector 90, will be inherently tilted, with the angle of tilt in relation to the vertical axis being proportional to the offset between the pole pieces. In this embodiment, two tilt coils 74 and 76 are utilized to bring the average direction of the primary magnetic field in substantial parallel alignment with pick-up loop plane 75. As in the previous embodiment, tilt coil 74 is wound about top pole piece 64 and tilt coil 76 is wound about bottom pole piece 66, as illustrated. Tilt coils 72, 74, 76 and 78 can be configured as in any of the circuits of FIGS. 8A–C.

When current is supplied to tilt coils 74 and 76, a secondary magnetic field having an average direction, as characterized by vector 92, will result. The primary and secondary magnetic fields will interact, with the secondary magnetic field compensating for the inherent tilt of the primary magnetic field to the extent necessary to bring the average direction of the resulting magnetic field, as characterized by vector 55 in FIG. 9, into substantial alignment with pick-up loop plane 75.

If the tilt coil currents are driven with the same waveshape as drive coils 68 and 70, but of a different amplitude, the average direction of the magnetic field will be tilted to compensate for the inherent angle of the primary magnetic field. In this embodiment, the tilt coil drive circuit will have substantially the same structure and function as in the first embodiment, however, The phase of the current driving coils 74 and 76 will be constant. In this manner, if the average direction of the primary magnetic field is downstream, the average direction of the secondary magnetic field, will be upstream. Likewise, if the average direction of the primary magnetic field is upstream, the average direction of the secondary magnetic field, will be downstream. It will be obvious to those reasonably skilled in the arts that the position and configuration of pole pieces 66 and 68 and tilt coils 74 and 76 is not limited to those illustrated in FIG. 9.

As in the first embodiment, the magnitude, polarity and phase of the current driving tilt coils 74 and 76 may be set during calibration of the flowmeter at the factory, or thereafter, using variable controls. Alternately, the flowmeter may be continually self-calibrating, as previously described in the circuitry illustrated in FIG. 8C.

It will be further obvious to those reasonably skilled in the arts that flowtube 62 of the second embodiment may be manufactured to have the dielectric characteristics as set forth in accordance with the first aspect of the invention. It will be further obvious to those reasonably skilled in the art that a flowmeter utilizing the tilt coils in accordance with the invention may have electrodes which are embedded within the flowtube walls, i.e. non-wetted electrodes, or, wetted electrodes, which are in direct contact with the process fluid. It will be further obvious to those skilled in the arts that various other configurations and numbers of the tilt coils and accompanying driving circuits may be utilized so long as the average direction of the secondary magnetic field generated by the tilt coils coacts with the average direction of the primary magnetic field generated by the drive coils to bring the average direction of the resulting magnetic field into substantial alignment with the plane of the pick-up loop.

Accordingly, it will be appreciated that the detailed disclosure has been presented by way of example only and is not intended to be limiting. Various alterations, modifications and improvements will readily occur to those skilled in the art, and may be practiced without departing from the spirit and scope of the invention. The invention is limited only as required by the following claims and equivalents thereto.

What is claimed is:

1. A magnetic flowmeter for measuring the flow rate of a fluid comprising:

a conduit adapted to carry the fluid whose flow rate is to be measured, the conduit extending longitudinally along a first axis;

a magnetic field source for creating a time varying magnetic field passing through the conduit and the fluid, the average direction of the magnetic field extending at a non-zero angle to the first axis;

electrode means, coupled to the conduit, for detecting an induced signal generated by motion of the fluid through the magnetic field; and means, electrically coupled to the magnetic field source, for electrically altering the average direction of the magnetic field, relative to the first axis, to provide a zero offset magnetic field yielding the induced signal having a value of substantially zero when the velocity of the fluid in the conduit is approximately zero;

a measuring circuit, coupled to the electrode means, which receives and processes the induced signal and outputs a signal representative of the average velocity of the fluid through the conduit.

2. The flowmeter of claim 1 wherein the magnetic flowmeter further comprises a measuring circuit means, coupled to the electrode means, for receiving and processing the induced signal detected by the electrode means.

3. The flowmeter of claim 2 wherein said means for electrically altering the average direction of the magnetic field comprises:

a plurality of secondary, current carrying windings, at least one secondary winding disposed adjacent each of the pole pieces, for partially generating the magnetic field emitted by the pole piece; and a secondary circuit means, coupled to the secondary windings, for supplying current to the secondary windings; and wherein said secondary circuit means is responsive to the measuring circuit means and supplies current to the secondary coils according to the induced signal processed by measuring circuit means.

4. The magnetic flowmeter of claim 3, wherein the means for electrically altering the average direction of the magnetic field is responsive to changes in the average direction of the summed magnetic field which results in voltage spikes in the induced signal, the means for altering compensating for the voltage spikes which are measured by the measuring circuit means.

5. The flowmeter of claim 1 wherein the magnetic field source comprises:

a pair of pole pieces disposed diametrically opposite each other about the exterior of the conduit and formed of a ferrous material;

a pair of primary, current carrying windings, one winding disposed adjacent each of the pole pieces, for at least partially generating the magnetic field emitted by the pole pieces; and a primary circuit means, coupled to the primary windings, for supplying current to the primary windings.

6. The flowmeter of claim 5 wherein said means for altering comprises:

a plurality of secondary, current carrying windings, at least one secondary winding disposed adjacent each of the pole pieces, for partially generating the magnetic field emitted by the pole piece, and a secondary circuit means, coupled to the secondary windings, for supplying current to the secondary windings.

7. The flowmeter of claim 6 wherein said plurality of secondary windings comprises at least four secondary windings, two secondary windings disposed adjacent each of the pole pieces.

8. A magnetic flowmeter for measuring a flow rate of a fluid, comprising:

a conduit adapted to carry the fluid to be measured;

a primary magnetic field source which provides a primary magnetic field passing through the conduit and the fluid;

a pair of electrodes, coupled to the conduit, which detect a signal resulting from motion of the fluid through the conduit; and a secondary magnetic field source which provides a secondary magnetic field passing through the conduit and the fluid and which is added to the primary magnetic field to create a summed magnetic field, wherein an average direction of the summed magnetic field is altered relative to a longitudinal axis of the conduit, to yield the resulting signal having a value of substantially zero when a velocity of the fluid in the conduit is substantially zero; and a measuring circuit, coupled to the pair of electrodes, which receives and processes the resulting signal and outputs a signal representative of the average velocity of the fluid through the conduit.

9. The flowmeter of claim 8, wherein the average direction of the summed magnetic field is in alignment with a pick-up loop plane so as to minimize an amount of magnetic flux penetrating the pick-up loop plane.

10. The magnetic flowmeter of claim 8, wherein the primary magnetic field source comprises:

a pair of pole pieces disposed diametrically opposite each other about an exterior of the conduit;

a pair of primary current carrying windings, each primary current carrying winding disposed adjacent each pole piece, which generate the primary magnetic field; and a driver circuit, coupled to the primary windings, for supplying a current, having a first phase, to the primary current carrying windings.

11. The flowmeter as claimed in claim 10, wherein the secondary magnetic field source comprises:

a plurality of secondary current carrying windings, each secondary current carrying winding being disposed adjacent a respective pole piece; and a secondary driver circuit, coupled to the secondary current carrying windings, for supplying a current, having a second phase, to the secondary windings.

12. The flowmeter as claimed in claim 11, wherein said plurality of secondary current carrying windings comprise four secondary current carrying windings, two current carrying windings disposed adjacent each pole piece.

13. The flowmeter of claim 12, wherein two secondary current carrying windings are wound in a counter-clockwise direction and two secondary current carrying windings are wound in a clockwise direction.

14. A magnetic flowmeter for measuring a flow rate of a fluid, comprising:

a conduit adapted to carry the fluid to be measured;

a primary magnetic field source which provides a primary magnetic field passing through the conduit and the fluid;

a pair of electrodes, coupled to the conduit, which detect a signal resulting from motion of the fluid through the magnetic field;

a secondary magnetic field source which provides a secondary magnetic field passing through the conduit and the fluid and which is added to the primary magnetic field to create a summed magnetic field, wherein an average direction of the summed magnetic field, relative to a longitudinal axis of the conduit, yields the resulting signal which is substantially zero when a velocity of the fluid in the conduit is substantially zero; and a measuring circuit, coupled to the pair of electrodes, which receives and processes the resulting signal and outputs a signal representative of the average velocity of the fluid through the conduit.

15. The magnetic flowmeter of claim 14, wherein the secondary magnetic field source is responsive to changes in the average direction of the summed magnetic field which results in voltage spikes in the resulting signal, the secondary magnetic field source thereby compensating for the voltage spikes which are measured by the measuring circuit.

16. A magnetic flowmeter for measuring a flow rate of a fluid, comprising:

a conduit adapted to carry the fluid to be measured;

a primary magnetic field source which provides a primary magnetic field passing through the conduit and the fluid;

a pair of electrodes, coupled to the conduit, which detect a signal resulting from motion of the fluid through the magnetic field;

a secondary magnetic field source which provides a secondary magnetic field passing through the conduit and the fluid and which is added to the primary magnetic field to create a summed magnetic field, wherein an average direction of the summed magnetic field, relative to a longitudinal axis of the conduit, yields the resulting signal which substantially zero when a velocity of the fluid in the conduit is substantially zero;

wherein the primary magnetic field source comprises:
a pair of pole pieces disposed diametrically opposite each other about an exterior of the conduit;
a pair of primary current carrying windings, each primary current carrying winding disposed adjacent each pole piece, which generate the primary magnetic field; and
a driver circuit coupled to the primary windings, for supplying a current, having a first phase, to the primary current carrying windings;

wherein the secondary magnetic field source comprises:
a plurality of secondary current carrying windings, each secondary current carrying winding being disposed adjacent a respective pole piece; and
a secondary driver circuit, coupled to the secondary current carrying windings, for supplying a current, having a second phase, to the secondary windings; and wherein the second phase is in phase with the first phase and the average direction of the summed magnetic field is altered in a first direction with respect to the longitudinal axis.

17. A magnetic flowmeter for measuring a flow rate of a fluid, comprising:

a conduit adapted to carry the fluid to be measured;

a primary magnetic field source which provides a primary magnetic field passing through the conduit and the fluid;

a pair of electrodes, coupled to the conduit, which detect a signal resulting from motion of the fluid through the magnetic field;

a secondary magnetic field source which provides a secondary magnetic field passing through the conduit and the fluid and which is added to the primary magnetic field to create a summed magnetic field, wherein an average direction of the summed magnetic field, relative to a longitudinal axis of the conduit, yields the resulting signal which is substantially zero when a velocity of the fluid in the conduit is substantially zero;

wherein the primary magnetic field source comprises:
a pair of pole pieces disposed diametrically opposite each other about an exterior of the conduit;
a pair of primary current carrying windings, each primary current carrying winding disposed adjacent each pole piece, which generate the primary magnetic field; and
a driver circuit, coupled to the primary windings, for supplying a current, having a first phase, to the primary current carrying windings, wherein the secondary magnetic field source comprises:
a plurality of secondary current carrying windings, each secondary current carrying winding being disposed adjacent a respective pole piece; and
a secondary driver circuit, coupled to the secondary current carrying windings, for supplying a current, having a second phase, to the secondary windings; and wherein the second phase is 180° out of phase with the first phase and the average direction of the summed magnetic field is altered in a second direction with respect to the longitudinal axis.

18. A magnetic flowmeter for measuring a flow rate of a fluid, comprising:

a conduit adapted to carry the fluid to be measured;

a primary magnetic field source which provides a primary magnetic field passing through the conduit and the fluid;

a pair of electrodes, coupled to the conduit, which detect a signal resulting from motion of the fluid through the magnetic field;

a secondary magnetic field source which provides a secondary magnetic field passing through the conduit and the fluid and which is added to the primary magnetic field to create a summed magnetic field, wherein an average direction of the summed magnetic field, relative to a longitudinal axis of the conduit, yields the resulting signal which is substantially zero when a velocity of the fluid in the conduit is substantially zero; and wherein the primary magnetic field source comprises:
a pair of pole pieces disposed diametrically opposite each other about an exterior of the conduit;
a pair of primary current carrying windings, each primary current carrying winding disposed adjacent each pole piece, which generate the primary magnetic field; and
a driver circuit, coupled to the primary windings, for supplying a current, having a first phase, to the primary current carrying windings, wherein the secondary magnetic field source comprises:
a plurality of secondary current carrying windings, each secondary current carrying winding being disposed adjacent a respective pole piece; and
a secondary driver circuit, coupled to the secondary current carrying windings and responsive to a measuring circuit, for supplying a current, having a second phase, to the secondary windings;

an induction spike measuring circuit, coupled to the pair of electrodes, which receives the resulting signal, measures an amplitude of an induction spike and stores an amplitude value; and a current adjustment circuit, responsive to the induction spike measurement circuit, which adjusts an amplitude and phase of the current driving the plurality of secondary coils to minimize the measured amplitude of the induction spike.

19. A magnetic flowmeter for measuring a flow rate of a fluid, comprising:

a conduit adapted to carry the fluid to be measured;

a primary magnetic field source which provides a primary magnetic field passing through the conduit and the fluid;

a pair of electrodes, coupled to the conduit, which detect a signal resulting from motion of the fluid through the magnetic field;

a secondary magnetic field source which provides a secondary magnetic field passing through the conduit and the fluid and which is added to the primary magnetic field to create a summed magnetic field, wherein an average direction of the summed magnetic field, relative to a longitudinal axis of the conduit, yields the resulting signal which is substantially zero when a velocity of the fluid in the conduit is substantially zero; and wherein the primary magnetic field source comprises:
- a pair of pole pieces disposed diametrically opposite each other about an exterior of the conduit;
- a pair of primary current carrying windings, each primary current carrying winding disposed adjacent each pole piece, which generate the primary magnetic field; and
- a driver circuit, coupled to the primary windings, for supplying a current, having a first phase, to the primary current carrying windings; and wherein the pair of pole pieces are offset along the longitudinal axis of the flow tube by a predetermined distance.

20. In a flowmeter, a method for providing a resulting signal indicating a value of substantially zero when a velocity of a fluid flowing through a conduit, of the flowmeter, is substantially zero, the method comprising the steps of:

providing a primary magnetic field passing through the conduit and the fluid;

providing a secondary magnetic field, passing through the conduit and the fluid, which is added to the primary magnetic field to create a summed magnetic field;

holding the velocity of the fluid flowing through the conduit at substantially zero; and providing the secondary magnetic field with a predetermined amplitude and phase so as to alter an average direction of the summed magnetic field to yield the resulting signal having the value of substantially zero when the velocity of the fluid in the conduit is substantially zero.

21. In a flowmeter, a method for providing a resulting signal indicating a value of substantially zero when a velocity of a fluid flowing through a conduit, of the flowmeter, is substantially zero, the method comprising the steps of:

providing a primary magnetic field passing through the conduit and the fluid;

providing a secondary magnetic field, passing through the conduit and the fluid, which is added to the primary magnetic field to create a summed magnetic field, wherein an average direction of the summed magnetic field yields the resulting signal indicating the value of substantially zero when the velocity of the fluid in the conduit is substantially zero; and wherein the primary magnetic field is provided with a first phase and the secondary magnetic field is provided with a second phase.

22. The method as claimed in claim 21, wherein the second phase is in phase with the first phase and the average direction of the summed magnetic field is altered in a first direction with respect to the primary magnetic field.

23. A method as claimed in claim 21, wherein the second phase is 180° out of phase with the first phase and the average direction of the summed magnetic field is altered in a second direction with respect to the primary magnetic field.

* * * * *